(12) United States Patent
Otsu

(10) Patent No.: US 10,104,657 B2
(45) Date of Patent: Oct. 16, 2018

(54) COMMUNICATION SYSTEM, WIRELESS COMMUNICATION APPARATUS, AND WIRELESS COMMUNICATION METHOD

(71) Applicant: NEC Corporation, Tokyo (JP)

(72) Inventor: Makoto Otsu, Tokyo (JP)

(73) Assignee: NEC Corporation, Tokyo (JP)

( * ) Notice: Subject to any disclaimer, the term of this patent is extended or adjusted under 35 U.S.C. 154(b) by 109 days.

(21) Appl. No.: 15/120,480

(22) PCT Filed: Feb. 10, 2015

(86) PCT No.: PCT/JP2015/000604
§ 371 (c)(1),
(2) Date: Aug. 19, 2016

(87) PCT Pub. No.: WO2015/125439
PCT Pub. Date: Aug. 27, 2015

(65) Prior Publication Data
US 2017/0070990 A1 Mar. 9, 2017

(30) Foreign Application Priority Data
Feb. 20, 2014 (JP) ................. 2014-030768

(51) Int. Cl.
H04W 72/04 (2009.01)
H04W 56/00 (2009.01)
H04J 3/06 (2006.01)

(52) U.S. Cl.
CPC ....... *H04W 72/0446* (2013.01); *H04J 3/0641* (2013.01); *H04J 3/0667* (2013.01); *H04W 56/002* (2013.01); *H04W 56/0015* (2013.01)

(58) Field of Classification Search
None
See application file for complete search history.

(56) References Cited

U.S. PATENT DOCUMENTS 8,954,609 B1 * 2/2015 Holleman ............. H04J 3/0667
709/203
9,261,898 B1 * 2/2016 Allen ........................ G06F 1/10
(Continued)

FOREIGN PATENT DOCUMENTS

JP  H11-154891 A  6/1999
JP  2003-158510 A  5/2003
(Continued)

OTHER PUBLICATIONS

International Search Report coresponding to PCT/JP2015/000604 dated May 12, 2015 (one page).

*Primary Examiner* — Bunjob Jaroenchonwanit
(74) *Attorney, Agent, or Firm* — Wilmer Cutler Pickering Hale and Dorr LLP

(57) ABSTRACT

This invention provides a communication system, a wireless communication apparatus and a wireless communication method wherein times can be synchronized with high precision. A communication apparatus (10) comprises: a clock unit (11) that counts a first time; a reception unit (12) that receives a time synchronization message transmitted from a transmission source apparatus; a time synchronization message processing unit (13) that updates time information of the received time synchronization message on the basis of the first time; a transmission unit (15) that transmits the time synchronization message, the time information of which has been updated, to a communication apparatus (20) via a communication line (2) and communication apparatuses (30, 40); and a time synchronization unit (14) that executes time synchronization, which is based on the first time, together with the communication apparatus (20) via the communication line (2) and communication apparatuses (30, 40).

9 Claims, 19 Drawing Sheets

(56) References Cited

U.S. PATENT DOCUMENTS

| | | | |
|---|---|---|---|
| 2005/0281247 A1* | 12/2005 | Lim | H04J 3/0647 370/350 |
| 2006/0203851 A1* | 9/2006 | Eidson | H04J 3/0667 370/503 |
| 2008/0037987 A1* | 2/2008 | Bradley | H04B 10/0773 398/59 |
| 2008/0225897 A1* | 9/2008 | Bryant | H04J 3/0679 370/503 |
| 2008/0244696 A1* | 10/2008 | Bhola | G06F 21/6218 726/1 |
| 2010/0048199 A1* | 2/2010 | Forslow | H04W 24/08 455/423 |
| 2010/0183016 A1* | 7/2010 | Bonk | G06F 1/14 370/400 |
| 2011/0111716 A1* | 5/2011 | Watanabe | H03G 3/3078 455/232.1 |
| 2011/0305173 A1* | 12/2011 | Wang | H04L 12/4625 370/296 |
| 2011/0305247 A1* | 12/2011 | Le Pallec | H04J 3/0664 370/503 |
| 2011/0307718 A1* | 12/2011 | Aybay | G06F 1/3206 713/310 |
| 2012/0203933 A1* | 8/2012 | de Araujo | H04J 3/0658 709/248 |
| 2012/0278421 A1* | 11/2012 | Sun | H04Q 9/00 709/208 |
| 2012/0307845 A1* | 12/2012 | Le Pallec | H04J 3/0661 370/503 |
| 2013/0103997 A1* | 4/2013 | Song | G01R 31/31727 714/731 |
| 2014/0050078 A1* | 2/2014 | Sato | H04L 41/0654 370/228 |
| 2014/0269672 A1* | 9/2014 | Zampetti | H04W 56/0015 370/350 |
| 2015/0121115 A1* | 4/2015 | Chandra | H04J 3/0667 713/400 |
| 2015/0124681 A1* | 5/2015 | Zhou | H04M 3/567 370/312 |
| 2015/0171980 A1* | 6/2015 | Bui | H04L 43/10 370/393 |
| 2015/0236807 A1* | 8/2015 | Mizrahi | H04J 3/0641 370/503 |
| 2015/0288473 A1* | 10/2015 | Ruffini | H04J 3/065 398/154 |
| 2015/0341876 A1* | 11/2015 | Abraham | H04W 56/001 370/509 |
| 2016/0197719 A1* | 7/2016 | Wang | H04J 3/0641 709/248 |
| 2017/0085407 A1* | 3/2017 | Agee | H04B 7/0413 |

FOREIGN PATENT DOCUMENTS

| | | |
|---|---|---|
| JP | 2011-151530 A | 8/2011 |
| JP | 2013-165326 A | 8/2013 |

* cited by examiner

COMMUNICATION SYSTEM, WIRELESS COMMUNICATION APPARATUS, AND WIRELESS COMMUNICATION METHOD

CROSS-REFERENCE TO RELATED APPLICATIONS

This application is a national stage application of International Application No. PCT/JP2015/000604 entitled "Communication System, Wireless Communication Apparatus, and Wireless Communication Method" filed on Feb. 10, 2015, which claims priority to Japanese Application No. 2014-030768 filed on Feb. 20, 2014, the disclosures of which are hereby incorporated by reference in their entirety.

TECHNICAL FIELD

The present invention relates to a communication system, a wireless communication apparatus, and a wireless communication method, and in particular, relates to a communication system, a wireless communication apparatus, and a wireless communication method that perform time synchronization.

BACKGROUND ART

Redundancy technologies in which communication is performed using a plurality of communication lines are used. As one of the redundancy technologies, an aggregation technology is known. The aggregation can secure a wide communication band and can improve the reliability by aggregating a plurality of communication lines into one communication line. Here, all of technologies for aggregating a plurality of communication lines into one communication line are referred to as aggregations. As related literature of aggregations, PTL 1 is known, for example.

In the meanwhile, as a standard for synchronizing times between a plurality of communication apparatuses, IEEE1588 (Precision Time Protocol: PTP) is known. In IEEE1588, a PTP packet in which a clock time of the own apparatus is written is transmitted/received, so that time synchronization between communication apparatuses becomes possible. As related literature of time synchronization by IEEE1588, PTL 2 is known, for example.

CITATION LIST

Patent Literature

[PTL 1]
JP 2003-158510 A
[PTL 2]
JP 2013-165326 A

SUMMARY OF INVENTION

Technical Problem

However, in the redundancy technologies such as aggregations, a method for achieving time synchronization using IEEE1588 has not ever been considered. For example, when a failure occurs in any of a plurality of communication lines, times cannot be synchronized accurately using a PTP packet. Thus, in the related technologies, there is a problem in that it is difficult to synchronize times with high precision in a redundancy configuration using a plurality of communication lines.

In view of the foregoing problem, an object of the present invention is to provide a communication system, a wireless communication apparatus, and a wireless communication method capable of synchronizing times with high precision.

Solution to Problem

A communication system according to the present invention includes: first and second communication apparatuses connected via a first communication line; and third and fourth communication apparatuses connected via a second communication line, wherein the first communication apparatus includes: a first clock unit that counts a first time; a first reception unit that receives a time synchronization message transmitted from a transmission source apparatus; a first time synchronization message processing unit that updates time information of the received time synchronization message on the basis of the first time; a first transmission unit that transmits the time synchronization message, the time information of which has been updated, to the second communication apparatus via a pathway including the first communication line and a pathway including the third communication apparatus; and a first time synchronization unit that executes first time synchronization processing, which is based on the first time, together with the second communication apparatus via the pathway including the first communication line and the pathway including the third communication apparatus, and the second communication apparatus includes: a second clock unit that counts a second time; a second reception unit that receives the time synchronization message from the first communication apparatus via the pathway including the first communication line and a pathway including the fourth communication apparatus; a second time synchronization unit that executes second time synchronization processing for synchronizing the second time with the first time via the pathway including the first communication line and the pathway including the fourth communication apparatus; a second time synchronization message processing unit that updates the time information of the received time synchronization message on the basis of the second time; and a second transmission unit that transmits the time synchronization message, the time information of which has been updated, to a transmission destination apparatus.

A wireless communication apparatus according to the present invention includes: a clock unit that counts a time; a reception unit that receives a time synchronization message; a time synchronization message processing unit that updates time information of the time synchronization message on the basis of the time; a time synchronization unit that executes time synchronization processing together with an opposing wireless communication apparatus; and a transmission unit that transmits the time synchronization message, the time information of which has been updated, to a communication apparatus other than the opposing wireless communication apparatus.

A wireless communication apparatus according to the present invention includes: a clock unit that counts a time; a reception unit that receives a time synchronization message from a communication apparatus other than an opposing wireless communication apparatus; a time synchronization unit that executes time synchronization processing together with the opposing wireless communication apparatus; a time synchronization message processing unit that updates time information of the received time synchronization message on the basis of the time; and a transmission unit that transmits the time synchronization message, the time information of which has been updated.

A communication method according to the present invention is a communication method in a communication system including first and second communication apparatuses connected via a first communication line, and third and fourth communication apparatuses connected via a second communication line, and the communication method includes: in the first communication apparatus, counting a first time; receiving a time synchronization message transmitted from a transmission source apparatus; updating time information of the received time synchronization message on the basis of the first time; transmitting the time synchronization message, the time information of which has been updated, to the second communication apparatus via a pathway including the first communication line and a pathway including the third communication apparatus; and executing first time synchronization processing, which is based on the first time, together with the second communication apparatus via the pathway including the first communication line and the pathway including the third communication apparatus, and in the second communication apparatus, counting a second time; receiving the time synchronization message from the first communication apparatus via the pathway including the first communication line and a pathway including the fourth communication apparatus; executing second time synchronization processing for synchronizing the second time with the first time via the pathway including the first communication line and the pathway including the fourth communication apparatus; updating the time information of the received time synchronization message on the basis of the second time; and transmitting the time synchronization message, the time information of which has been updated, to a transmission destination apparatus.

A wireless communication method according to the present invention is a wireless communication method in a wireless communication apparatus, and the wireless communication method includes: counting a time; receiving a time synchronization message; updating time information of the time synchronization message on the basis of the time; executing time synchronization processing together with an opposing wireless communication apparatus; and transmitting the time synchronization message, the time information of which has been updated, to a communication apparatus other than the opposing wireless communication apparatus.

A wireless communication method according to the present invention is a wireless communication method in a wireless communication apparatus, and the wireless communication method includes: counting a time; receiving a time synchronization message from a communication apparatus other than an opposing wireless communication apparatus; executing time synchronization processing together with the opposing wireless communication apparatus; updating time information of the received time synchronization message on the basis of the time; and transmitting the time synchronization message, the time information of which has been updated.

Advantageous Effect of Invention

According to the present invention, a communication system, a wireless communication apparatus, and a wireless communication method capable of synchronizing times with high precision can be provided.

DESCRIPTION OF EMBODIMENTS

Reference Examples

Before describing exemplary embodiments, reference examples before applying the exemplary embodiments will be described. Here, as the reference examples, a configuration example for achieving aggregation, a configuration example for achieving IEEE1588, and an example in which a configuration of aggregation and a configuration of IEEE1588 are combined will be described.

Figure 15:
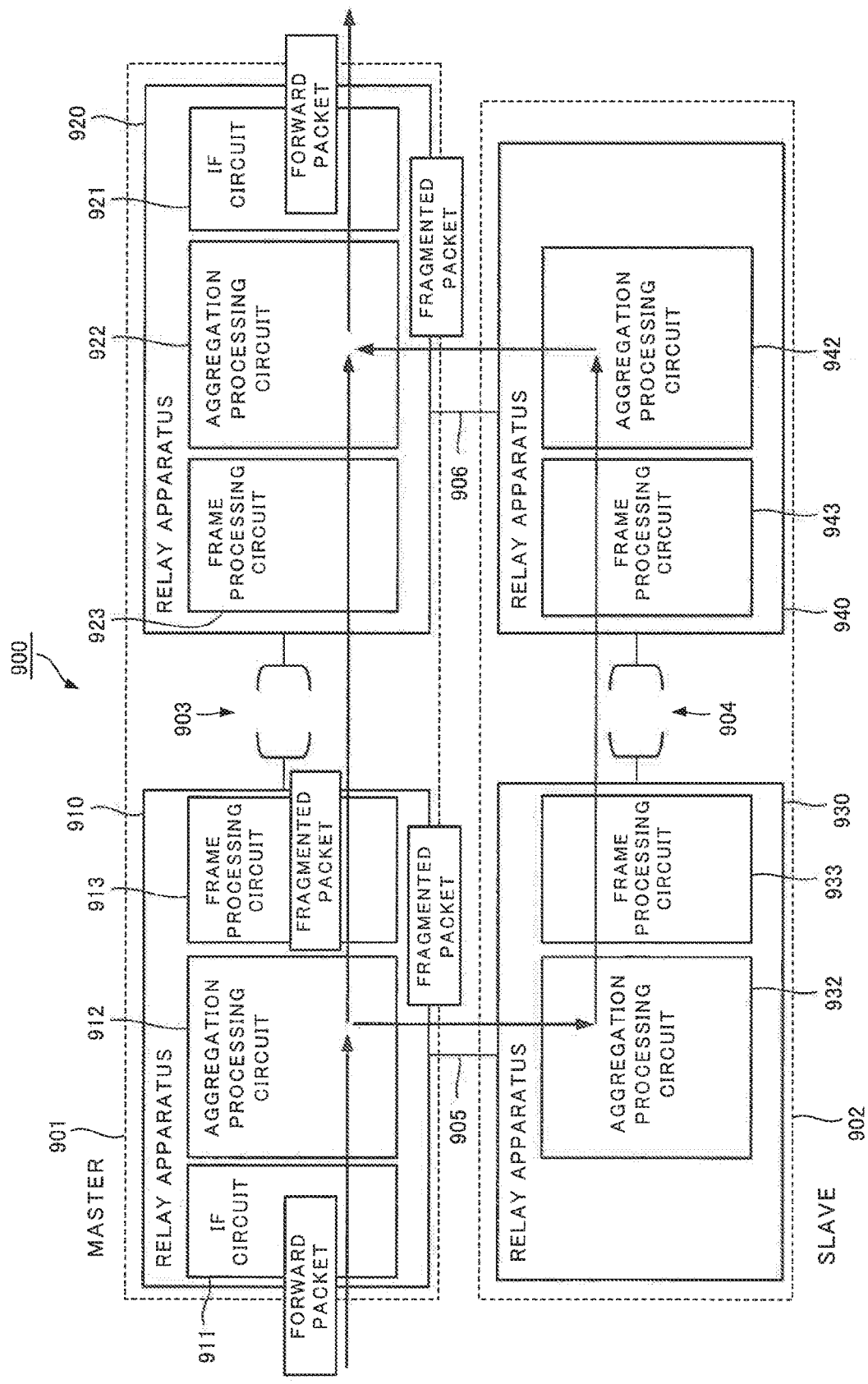
FIG. 15 is an illustration diagram for describing a configuration and an operation of a communication system of a reference example.

FIG. 15 illustrates a configuration example of a communication system 900 of a reference example in which communication is performed by aggregation.

As illustrated in FIG. 15, the communication system 900 of the reference example includes relay apparatuses 910 to 940. The relay apparatuses 910, 920 perform wireless communication via a wireless line 903 that is a master line, and configure a master communication unit 901 of aggregation. The relay apparatuses 930, 940 perform wireless communication via a wireless line 904 that is a slave line, and configure a slave communication unit 902 of aggregation.

In addition, the relay apparatus 910 on the master side and the relay apparatus 930 on the slave side are connected via a wire line 905, and the relay apparatus 920 on the master side and the relay apparatus 940 on the slave side are connected via a wire line 906.

The relay apparatus 910 includes an IF (interface) circuit 911, an aggregation processing circuit 912, and a frame processing circuit 913, and the relay apparatus 920 includes an IF circuit 921, an aggregation processing circuit 922, and a frame processing circuit 923. The relay apparatus 930 includes an aggregation processing circuit 932 and a frame processing circuit 933, and the relay apparatus 940 includes an aggregation processing circuit 942 and a frame processing circuit 943.

In the relay apparatus 910 on the transmitting side of the master communication unit 901, when the IF circuit 911 receives a forward packet to be forwarded, the aggregation processing circuit 912 fragments the forward packet into a plurality of fragmented packets, forwards a half of the fragmented packets to the relay apparatus 930 of the slave communication unit 902, and transmits the other half of the fragmented packets from the frame processing circuit 913 to the relay apparatus 920 via the wireless line 903.

In the relay apparatus 930 on the transmitting side of the slave communication unit 902, the aggregation processing circuit 932 receives the fragmented packets from the relay apparatus 910, and transmits the received fragmented packets to the relay apparatus 940 via the wireless line 904. The packets are transmitted by the two lines, the wireless lines 903, 904, so that the packets can be transmitted in twice a normal wireless band.

In the relay apparatus 940 on the receiving side of the slave communication unit 902, the frame processing circuit 943 receives the fragmented packets via the wireless line 904, and the aggregation processing circuit 942 forwards the fragmented packets to the relay apparatus 920 of the master communication unit 901.

In the relay apparatus 920 on the receiving side of the master communication unit 901, the frame processing circuit 923 receives the fragmented packets via the wireless line 903, and the aggregation processing circuit 922 unites the fragmented packets received from the relay apparatus 910 and the fragmented packets received from the relay apparatus 940 to restore the forward packet, and forwards the restored forward packet from the IF circuit 921 to a subsequence.

Figure 16:
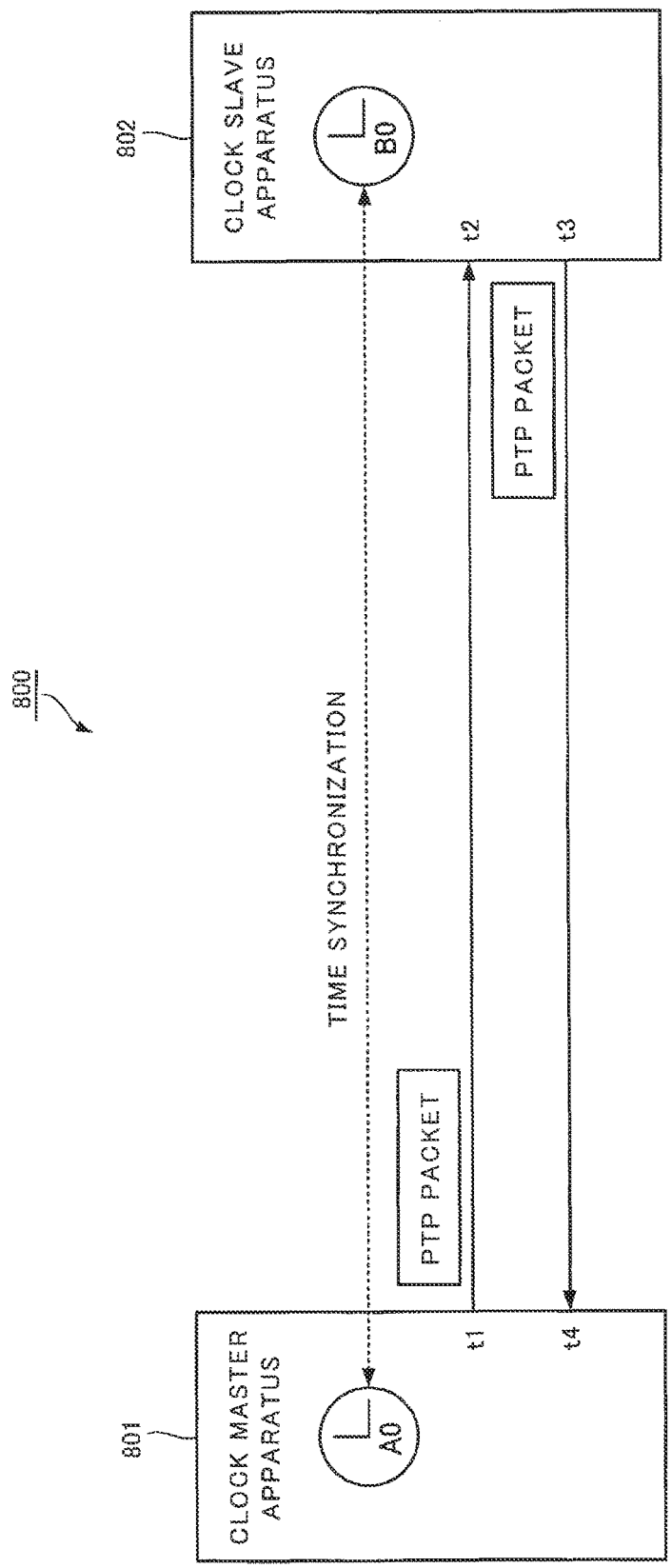
FIG. 16 is an illustration diagram for describing a configuration and an operation of a communication system of a reference example.

FIG. 16 illustrates a configuration example of a communication system 800 of a reference example in which time synchronization is performed by IEEE1588v2. The communication system 800 of the reference example includes a clock master apparatus 801 and a clock slave apparatus 802, and time synchronization is performed between the clock master apparatus 801 and the clock slave apparatus 802 by IEEE1588v2 with high precision.

A PTP packet that is a time synchronization packet defined in IEEE1588v2 is transmitted/received between the clock master apparatus 801 and the clock slave apparatus 802, so that the time synchronization is performed between the apparatuses.

A time of a timer A0 of the clock master apparatus 801 and a time of a timer B0 of the clock slave apparatus 802 are written in the PTP packet. The PTP packet is transmitted/received, so that a time t1 when the clock master apparatus 801 has transmitted the PTP packet, a time t2 when the clock slave apparatus 802 has received the PTP packet, a time t3 when the clock slave apparatus 802 has transmitted the PTP packet, and a time t4 when the clock master apparatus 801 has received the PTP packet are recorded. A delay time due to a communication line between the apparatuses is determined by the times t1 to t4, and the clock slave apparatus 802 corrects the time of the timer B0 using the delay time, so that the times of the timer A0 and the timer B0 are synchronized.

In IEEE1588v2, an average of a delay time (t2−t1) of a downstream line from the clock master apparatus toward the clock slave apparatus and a delay time (t4−t3) of an upstream line from the clock slave apparatus toward the clock master apparatus is regarded as the delay time between the apparatuses. Thus, in order for the apparatuses to be time-synchronized, it is premised that the amount of delay of the upstream line and the amount of delay of the downstream line between the apparatuses are the same.

Therefore, although the amount of delay of the upstream line and the amount of delay of the downstream line need to be the same in the example of FIG. 16, when a relay apparatus is placed between the apparatuses to be synchronized, the amount of delay of the upstream line and the amount of delay of the downstream line may be different. In order to enable time synchronization even when the upstream line and the downstream line are different, a TC (Transparent Clock) function is defined in IEEE1588v2.

Figure 17:
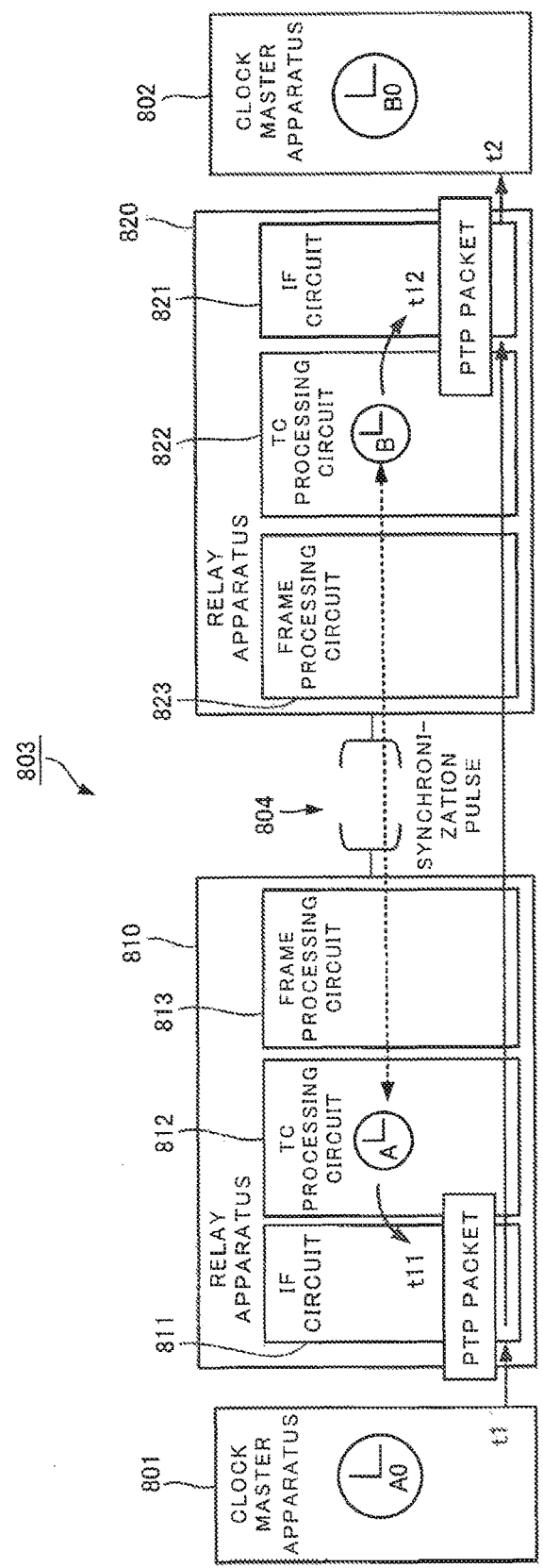
FIG. 17 is an illustration diagram for describing a configuration and an operation of a communication system of a reference example.

FIG. 17 illustrates a configuration example of a communication system 803 of a reference example in which time synchronization is performed by the TC function of IEEE1588v2.

As illustrated in FIG. 17, the communication system 803 includes relay apparatuses 810, 820 that perform wireless communication via a wireless line 804, between the clock master apparatus 801 and the clock slave apparatus 802.

A delay time that occurs in the relay apparatuses 810, 820 is multiplexed into CorrectionField in the PTP packet and is forwarded, so that time synchronization control of the clock master apparatus 801 and the clock slave apparatus 802 is performed while ignoring the amount of delay between the relay apparatuses.

The relay apparatus 810 includes an IF circuit 811, a TC (Transparent Clock) processing circuit 812, and a frame processing circuit 813, and the relay apparatus 820 includes an IF circuit 821, a TC processing circuit 822, and a frame processing circuit 823.

The relay apparatus 810 on the transmitting side and the relay apparatus 820 on the receiving side respectively include timers A and B. The relay apparatuses 810, 820 multiplex a synchronization pulse into a wireless frame that is transmitted/received via a wireless line 804, so that the both relay apparatuses are timer-synchronized.

In the relay apparatus 810 on the wireless transmitting side, when the PTP packet is inputted from the clock master apparatus 801 into the IF circuit 811, the TC processing circuit 812 subtracts a value of the timer A (t11) from CorrectionField in the PTP packet at the timing of input, and transmits the subtracted PTP packet from the frame processing circuit 813 to the relay apparatus 820 via the wireless line 804. In the relay apparatus 820 on the wireless receiving side, the frame processing circuit 823 receives the PTP packet via the wireless line 804, and the TC processing circuit 822 adds a value of the timer B (t12) to Correction-Field in the PTP packet at the timing of outputting the PTP packet from the IF circuit 821.

Accordingly, the amount of delay that occurs between the relay apparatuses is multiplexed into CorrectionField. Then, the delay time of the downstream line between the clock master apparatus and the clock slave apparatus becomes (t2−t1−t11+t12), and a delay between the relay apparatuses is deducted. Also in the upstream line, similarly, a delay between the relay apparatuses is deducted. Therefore, even if the amount of delay of the upstream line and the amount of delay of the downstream line between the relay apparatuses do not correspond to each other, the amount of delay of the upstream line and the amount of delay of the downstream line between the clock master apparatus and the clock slave apparatus are equal to each other, and thus, the time synchronization can be accurately performed between the master apparatus and the slave apparatus.

Figure 18:
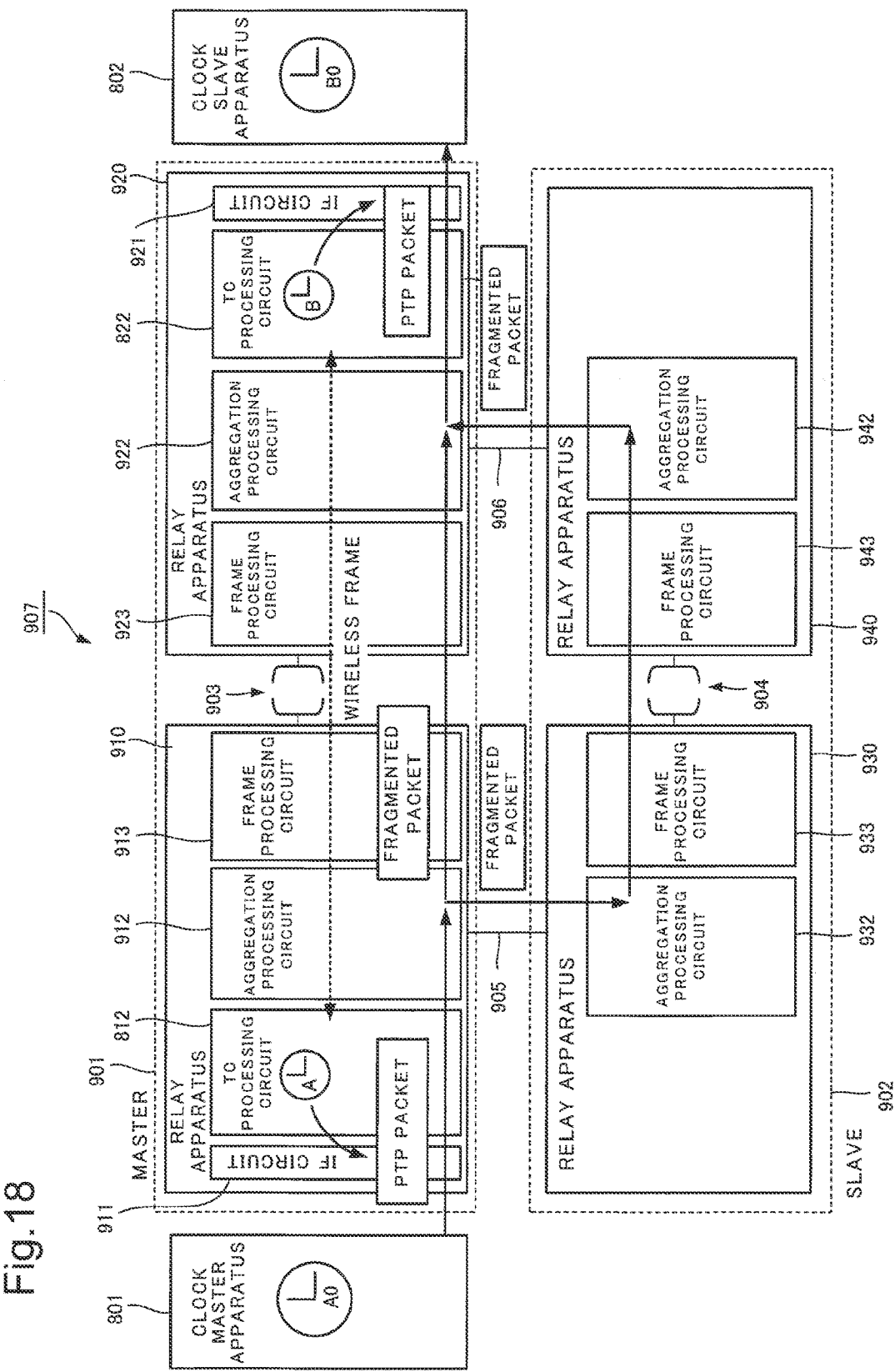
FIG. 18 is an illustration diagram for describing a configuration and an operation of a communication system of a reference example.

FIG. 18 illustrates a configuration of a communication system 907 of a reference example in which the TC function of IEEE1588v2 of FIG. 17 is applied to the configuration of FIG. 15, in which communication is performed by aggregation.

In FIG. 18, in addition to the configuration of FIG. 15, the relay apparatus 910 includes the TC processing circuit 812 of FIG. 17, and the relay apparatus 920 includes the TC processing circuit 822 of FIG. 17.

In the communication system 907, the relay apparatuses 910, 920 transmit/receive the wireless frame via the wireless line 903, so that the timer A and the timer B are synchronized.

In the relay apparatus 910, when the IF circuit 911 receives the PTP packet from the clock master apparatus 801, the TC processing circuit 812 subtracts the value of the timer A from CorrectionField in the PTP packet at the timing of reception.

The aggregation processing circuit 912 fragments the subtracted PTP packet into a plurality of fragmented packets, forwards a half of the fragmented packets to the relay apparatus 930, and forwards the other half of the fragmented packets from the frame processing circuit 913 to the relay apparatus 920 via the wireless line 903.

In addition, in the relay apparatus 940, the frame processing circuit 943 receives the fragmented packets via the wireless line 904, and the aggregation processing circuit 942 forwards the received fragmented packets to the relay apparatus 920 of the master communication unit 901.

In the relay apparatus 920, the frame processing circuit 923 receives the fragmented packets via the wireless line 903, and the aggregation processing circuit 922 unites the fragmented packets received from the relay apparatus 910 and the fragmented packets received from the relay apparatus 940 to restore the PTP packet. The TC processing circuit 822 adds the value of the timer B to CorrectionField in the PTP packet, and transmits the restored PTP packet from the IF circuit 921 to the clock slave apparatus 802 at this timing.

A problem that occurs in the communication system 907 of the reference example of FIG. 18 will be described using FIG. 19.

Figure 19:
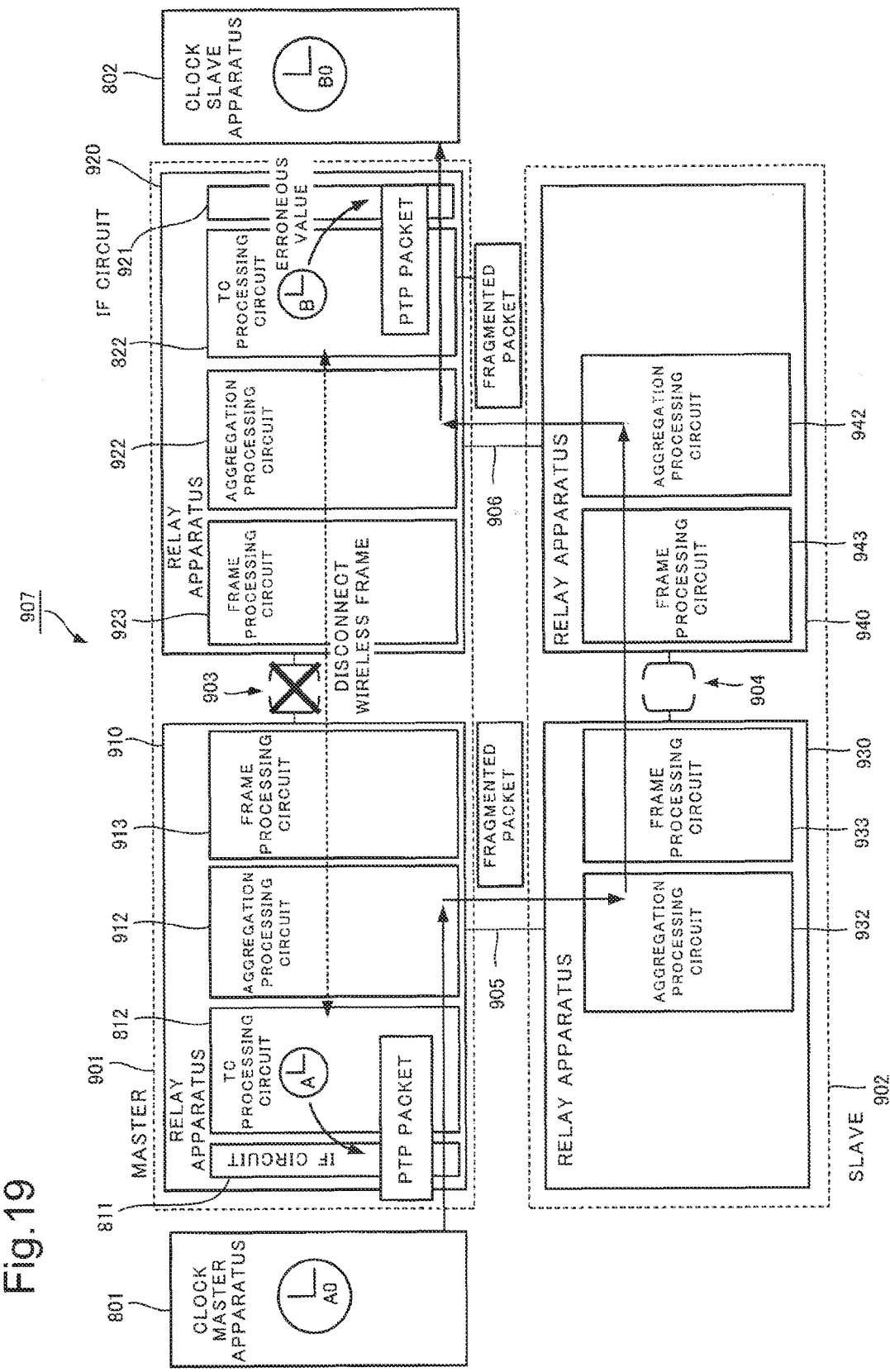
FIG. 19 is an illustration diagram for describing a configuration and an operation of a communication system of a reference example.

As illustrated in FIG. 19, when the wireless line 903 on the master side is disconnected and only the wireless line 904 on the slave side is connected, the fragmented packets obtained by fragmenting the PTP packet cannot be forwarded by the wireless line 903 on the master side. Thus, the fragmented packets are forwarded via only the wireless line 904 on the slave side. All of the fragmented packets are forwarded via the relay apparatus 930, the wireless line 904, and the relay apparatus 940, and then, are united in the relay apparatus 920, and the value of the timer B is added when outputting the PTP packet.

However, since the timer A and the timer B have been synchronized by the wireless frame of the wireless line 903 on the master side, by disconnecting the wireless line 903, the timer A and the timer B cannot be synchronized, and the time of the relay apparatus 910 and the time of the relay apparatus 920 are shifted from each other. Then, in the relay apparatus 920, an erroneous value due to the shift of the time is multiplexed into CorrectionField in the PTP packet. Accordingly, there is a problem that the time synchronization accuracy between the clock master apparatus 801 and the clock slave apparatus 802 is reduced.

Therefore, in a configuration in which communication is performed using a plurality of communication lines, the following exemplary embodiments make it possible to write an appropriate value into CorrectionField in a PTP packet.

Outline of Exemplary Embodiments

Figure 1:
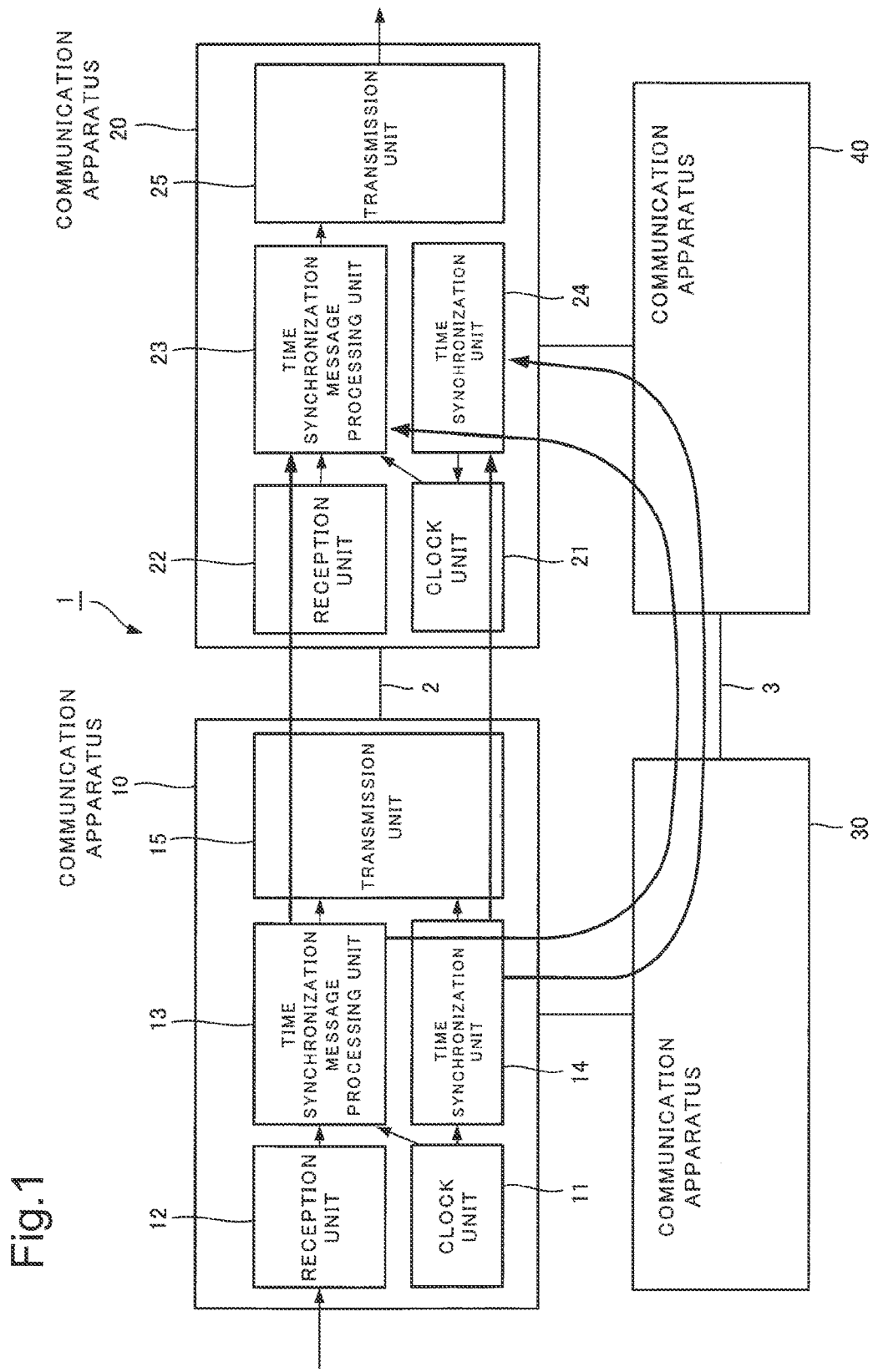
FIG. 1 is a configuration diagram illustrating an outline configuration of a communication system according to exemplary embodiments.

FIG. 1 illustrates an outline of a communication system 1 according to the exemplary embodiments. As illustrated in FIG. 1, the communication system 1 according to the exemplary embodiments includes a communication apparatus (first communication apparatus) 10, a communication apparatus (second communication apparatus) 20, a communication apparatus (third communication apparatus) 30, and a communication apparatus (fourth communication apparatus) 40.

The communication apparatus 10 and the communication apparatus 20 are communicably connected via a communication line (first communication line) 2. The communication apparatus 30 and the communication apparatus 40 are communicably connected via a communication line (second communication line) 3.

The communication apparatus 10 includes a clock unit (first clock unit) 11, a reception unit (first reception unit) 12, a time synchronization message processing unit (first time synchronization message processing unit) 13, a time synchronization unit (first time synchronization unit) 14, and a transmission unit (first transmission unit) 15.

The clock unit 11 counts a first time. The reception unit 12 receives a time synchronization message transmitted from a transmission source apparatus (not illustrated). The time synchronization message processing unit 13 updates time information of the received time synchronization message on the basis of the first time. The transmission unit 15 transmits the time synchronization message, the time information of which has been updated, to the communication apparatus 20 via a pathway including the communication line 2 and a pathway including the communication apparatus 30. The time synchronization unit 14 executes first time synchronization processing, which is based on the first time, together with the communication apparatus 20 via the pathway including the communication line 2 and the pathway including the communication apparatus 30.

For example, the communication apparatus 10 may be a wireless communication apparatus including the clock unit 11 that counts a time, the reception unit 12 that receives a time synchronization message, the time synchronization message processing unit 13 that updates time information of the time synchronization message on the basis of the time, the time synchronization unit 14 that executes time synchronization processing together with an opposing wireless communication apparatus (communication apparatus 20), and the transmission unit 15 that transmits the time synchronization message, the time information of which has been updated, to a communication apparatus other than the opposing wireless communication apparatus.

The communication apparatus 20 includes a clock unit (second clock unit) 21, a reception unit (second reception unit) 22, a time synchronization message processing unit (second time synchronization message processing unit) 23, a time synchronization unit (second time synchronization unit) 24, and a transmission unit (second transmission unit) 25.

The clock unit 21 counts a second time. The reception unit 22 receives the time synchronization message from the communication apparatus 10 via the pathway including the communication line 2 and a pathway including the communication apparatus 40. The time synchronization unit executes second time synchronization processing for synchronizing the second time with the first time via the pathway including the communication line 2 and the pathway including the communication apparatus 40. The time synchronization message processing unit 23 updates the time information of the received time synchronization message on the basis of the second time. The transmission unit 25 transmits the time synchronization message, the time information of which has been updated, to a transmission destination apparatus (not illustrated).

For example, the communication apparatus 20 may be a wireless communication apparatus including the clock unit 21 that counts a time, the reception unit 22 that receives a time synchronization message from a communication apparatus other than an opposing wireless communication apparatus (communication apparatus 10), the time synchronization unit 24 that executes time synchronization processing together with the opposing wireless communication apparatus, the time synchronization message processing unit 23 that updates time information of the received time synchronization message on the basis of the time, and the transmission unit 25 that transmits the time synchronization message, the time information of which has been updated.

As described above, in the exemplary embodiments, the synchronization processing between the communication apparatus 10 and the communication apparatus 20 is performed by the pathway via the communication line 2, and is performed via the communication apparatus 30, the communication line 3, and the communication apparatus 40. Accordingly, even when the communication line 2 fails, the synchronization processing can be performed via the communication apparatus 30, the communication line 3, and the communication apparatus 40. Therefore, an appropriate time can be written when forwarding the time synchronization message (PTP packet), and the time synchronization accuracy can be improved.

First Exemplary Embodiment

Figure 2:
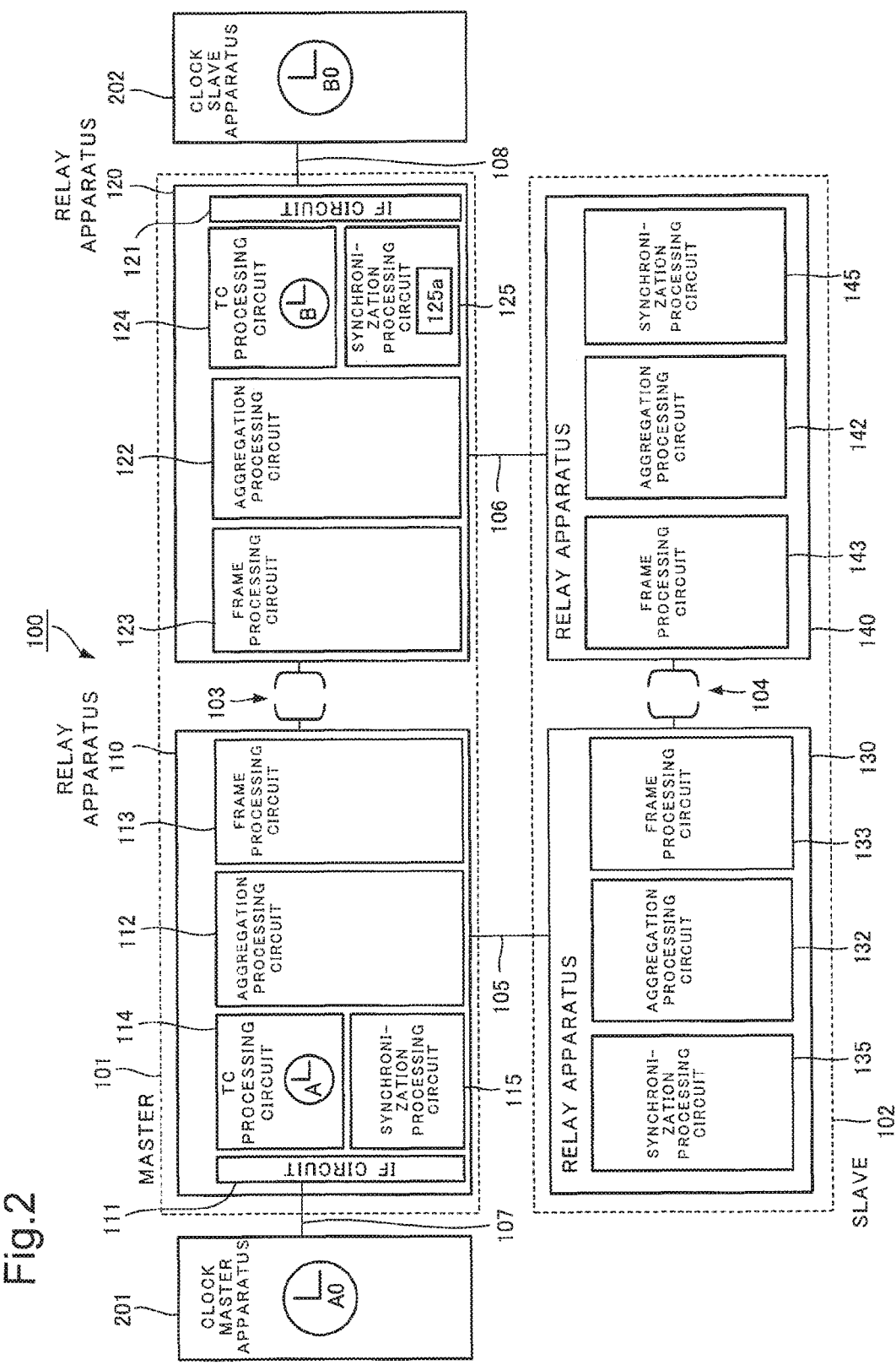
FIG. 2 is a configuration diagram illustrating a configuration of a communication system according to a first exemplary embodiment.

Hereinafter, a first exemplary embodiment will be described with reference to the drawings. FIG. 2 illustrates a configuration of a communication system 100 according to the first exemplary embodiment. As illustrated in FIG. 2, the communication system 100 according to the first exemplary embodiment includes a relay apparatus (first communication apparatus) 110, a relay apparatus (second communication apparatus) 120, a relay apparatus (third communication apparatus) 130, and a relay apparatus (fourth communication apparatus) 140.

The relay apparatuses 110, 120 perform wireless communication via a wireless line (first communication line) 103 that is a master line, and configure a master communication unit 101 of aggregation. The relay apparatuses 130, 140 perform wireless communication via a wireless line (second communication line) 104 that is a slave line, and configure a slave communication unit 102 of aggregation. It is to be noted that the relay apparatuses 110, 120, and the relay apparatuses 130, 140 may be communicably connected by wire lines without limiting to the wireless lines. In addition, communication by aggregation may be performed via a plurality of additional wireless lines without limiting to the two wireless lines.

The relay apparatus 110 on the transmitting side of the master communication unit 101 and the relay apparatus 130 on the transmitting side of the slave communication unit 102 are connected via a wire line 105, and the relay apparatus 120 on the receiving side of the master communication unit 101 and the relay apparatus 140 on the receiving side of the slave communication unit 102 are connected via a wire line 106. It is to be noted that the relay apparatuses 110, 130, and the relay apparatuses 120, 140 may be communicably connected by wireless lines without limiting to the wire lines.

In addition, the relay apparatus 110 is connected to a clock master apparatus (transmission source apparatus) 201 via a wire line 107, and the relay apparatus 120 is connected to a clock slave apparatus (transmission destination apparatus) 202 via a wire line 108. It is to be noted that the relay apparatuses may be connected via wireless lines or other networks without limiting to the wire lines. For example, the transmission rates of the wire lines 107, 108 are 1 Gbps, and the transmission rates of the wireless lines 103, 104 are 500 Mbps. The two wireless lines are aggregated, so that a transmission band equivalent to that of a wire line can be secured. In addition, the relay apparatuses 110 to 140 achieve a TC (Transparent Clock) function of IEEE1588 between the clock master apparatus 201 and the clock slave apparatus 202 to synchronize the times of the clock master apparatus 201 and the clock slave apparatus 202 with high precision. It is to be noted that another configuration in which the relay apparatuses update time information of a packet (message) to perform time synchronization may be used without limiting to the TC function of IEEE1588.

The relay apparatus 110 includes an IF (interface) circuit 111, an aggregation processing circuit 112, a frame processing circuit 113, a TC processing circuit 114, and a synchronization processing circuit 115.

The IF circuit (first reception unit) 111 is a transmitting/receiving (input/output) interface connected to the wire line 107. The IF circuit 111 receives a PTP packet (time synchronization message) or another forward packet from the clock master apparatus 201 via the wire line 107.

The aggregation processing circuit (first transmission unit) 112 is a circuit that performs processing necessary for forwarding the packet via the wireless lines 103, 104. The aggregation processing circuit 112 fragments the PTP packet or the forward packet (forward message) into fragmented packets (fragmented messages) having a predetermined length (for example, 256 bytes), transmits a part of the fragmented packets to the relay apparatus 120 via the wireless line 103, and transmits the other fragmented packets to the relay apparatus 120 via the relay apparatus 130, the wireless line 104, and the relay apparatus 140.

It is to be noted that, as aggregation processing, the packet may be directly forwarded to either pathway without being fragmented. In addition, a redundancy configuration in which one pathway as an active line and the other pathway as a standby line are switched may be used without limiting to an example in which a plurality of communication lines are aggregated into one communication line, as in aggregation.

The frame processing circuit 113 is a transmitting/receiving circuit that transmits/receives a wireless frame via the wireless line 103. The frame processing circuit 113 transmits the fragmented packets obtained by fragmenting the PTP packet or the forward packet to the relay apparatus 120 via the wireless line 103 by the wireless frame. In addition, the frame processing circuit 113 transmits the wireless frame into which a synchronization pulse is multiplexed.

The TC processing circuit (first time synchronization message processing unit) 114 is a circuit that performs processing necessary for the TC function of IEEE1588. The TC processing circuit 114 has a timer A, and updates CorrectionField in the PTP packet on the basis of a value of the timer A when receiving the PTP packet. The timer A is a first clock unit that counts a first time. A value that a timer counts is referred to as a timer value (clock value).

The synchronization processing circuit (first time synchronization unit) 115 executes time synchronization processing together with the relay apparatus 120. The synchronization processing circuit 115 performs synchronization processing via the wireless line 103 by multiplexing a synchronization pulse into the wireless frame of the wireless line 103. In addition, the synchronization processing circuit 115 performs synchronization processing via the relay apparatus 130, the wireless line 104, and the relay apparatus 140 by transmitting a synchronization packet to the relay apparatus 130.

The relay apparatus 130 includes an aggregation processing circuit 132, a frame processing circuit 133, and a synchronization processing circuit 135.

The aggregation processing circuit 132 receives the fragmented packets from the relay apparatus 110, and outputs the received fragmented packets to the frame processing circuit 133. The synchronization processing circuit 135 receives the synchronization packet from the relay apparatus 110, and outputs the received synchronization packet to the frame processing circuit 133. The frame processing circuit 133 transmits the wireless frame to the relay apparatus 140 via the wireless line 104, and transmits the fragmented packets or the synchronization packet using the wireless frame.

The relay apparatus 140 includes an aggregation processing circuit 142, a frame processing circuit 143, and a synchronization processing circuit 145.

The frame processing circuit 143 receives the wireless frame from the relay apparatus 130 via the wireless line 104, and receives the fragmented packets or the synchronization packet using the wireless frame. The aggregation processing circuit 142 receives the fragmented packets from the relay apparatus 130, and transmits the received fragmented packets to the relay apparatus 120 via the wire line 106. The synchronization processing circuit 145 receives the synchronization packet from the relay apparatus 130, and transmits the received synchronization packet to the relay apparatus 120 via the wire line 106.

The relay apparatus 120 includes an IF circuit 121, an aggregation processing circuit 122, a frame processing circuit 123, a TC processing circuit 124, and a synchronization processing circuit 125.

The frame processing circuit 123 receives the wireless frame from the relay apparatus 110 via the wireless line 103, and receives the fragmented packets using the wireless frame. In addition, the frame processing circuit 123 receives the wireless frame into which the synchronization pulse is multiplexed.

The aggregation processing circuit (second reception unit) 122 receives the fragmented packets from the relay apparatus 110 via the wireless line 103, and furthermore, receives the fragmented packets from the relay apparatus 140 via the wire line 106. The aggregation processing circuit 122 unites the fragmented packets received from the relay apparatus 110 and the fragmented packets received from the relay apparatus 140 to restore the forward packet or the PTP packet.

The synchronization processing circuit (second time synchronization unit) 125 executes time synchronization processing together with the relay apparatus 110. The synchronization processing circuit 125 synchronizes a timer B with the timer A by obtaining the synchronization pulse from the wireless frame received via the wireless line 103. In addition, the synchronization processing circuit 125 receives the synchronization packet from the relay apparatus 140, and synchronizes the timer B with the timer A using the received synchronization packet. The synchronization processing circuit 125 has a register (difference storage unit) 125a, and stores in the register a difference between a timer value in the received synchronization packet and a timer value of the timer B. The synchronization processing circuit 125 performs time synchronization via the wireless line 103 when the wireless line 103 is communicable, and performs time synchronization via the relay apparatus 130, the wireless line 104, and the relay apparatus 140 when the wireless line 103 is not communicable (and the wireless line 104 is communicable).

The TC processing circuit (second time synchronization message processing unit) 124 has the timer B, and updates CorrectionField in the PTP packet on the basis of a value of the timer B when transmitting the PTP packet. The IF circuit (second transmission unit) 121 is a transmitting/receiving (input/output) interface connected to the wire line 108. The IF circuit 121 transmits the PTP packet or another forward packet to the clock slave apparatus 202 via the wire line 108. The timer B is a second clock unit that counts a second time.

Figure 3:
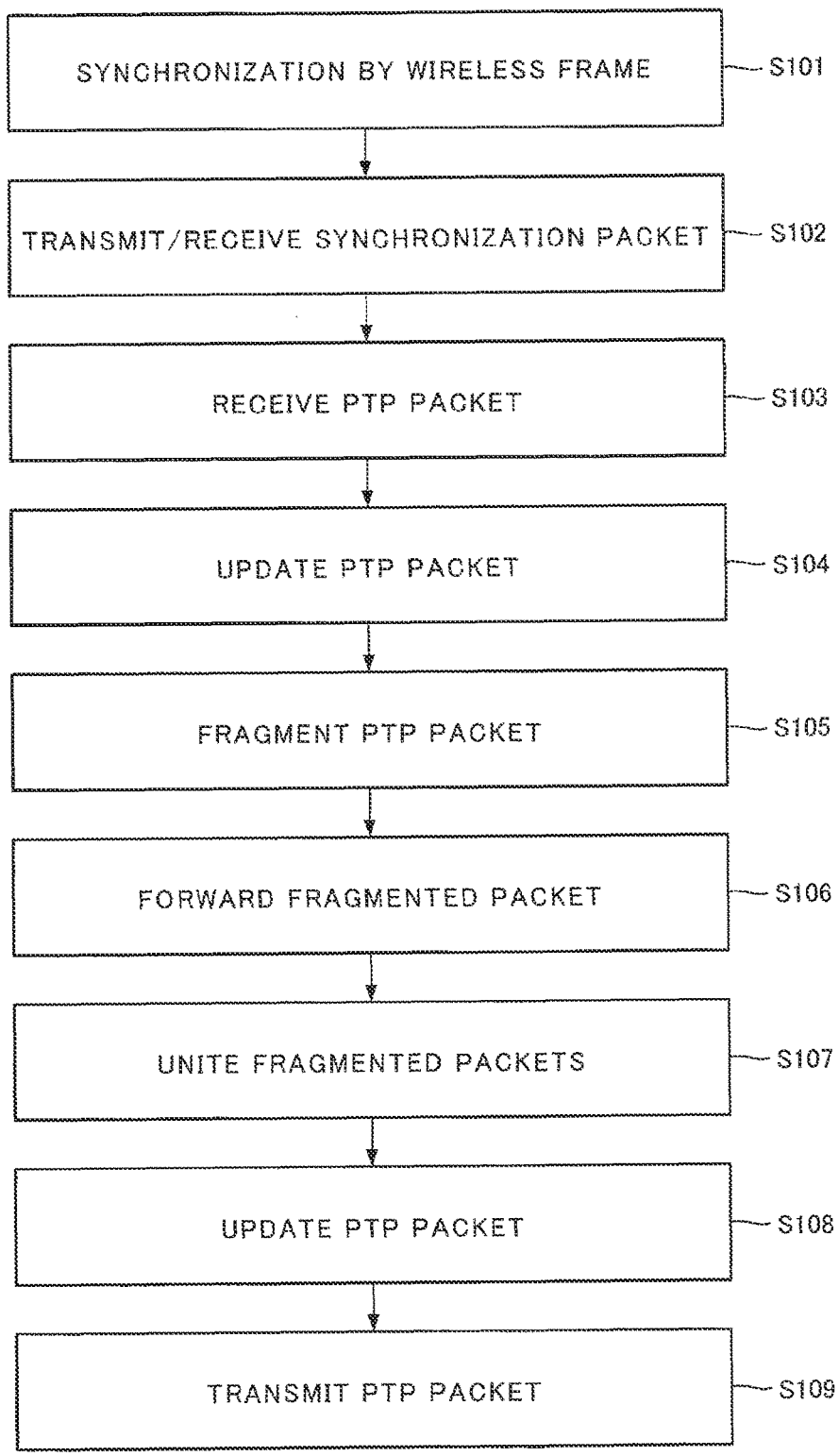
FIG. 3 is a flow chart illustrating an operation of the communication system according to the first exemplary embodiment at normal times.
Figure 4:
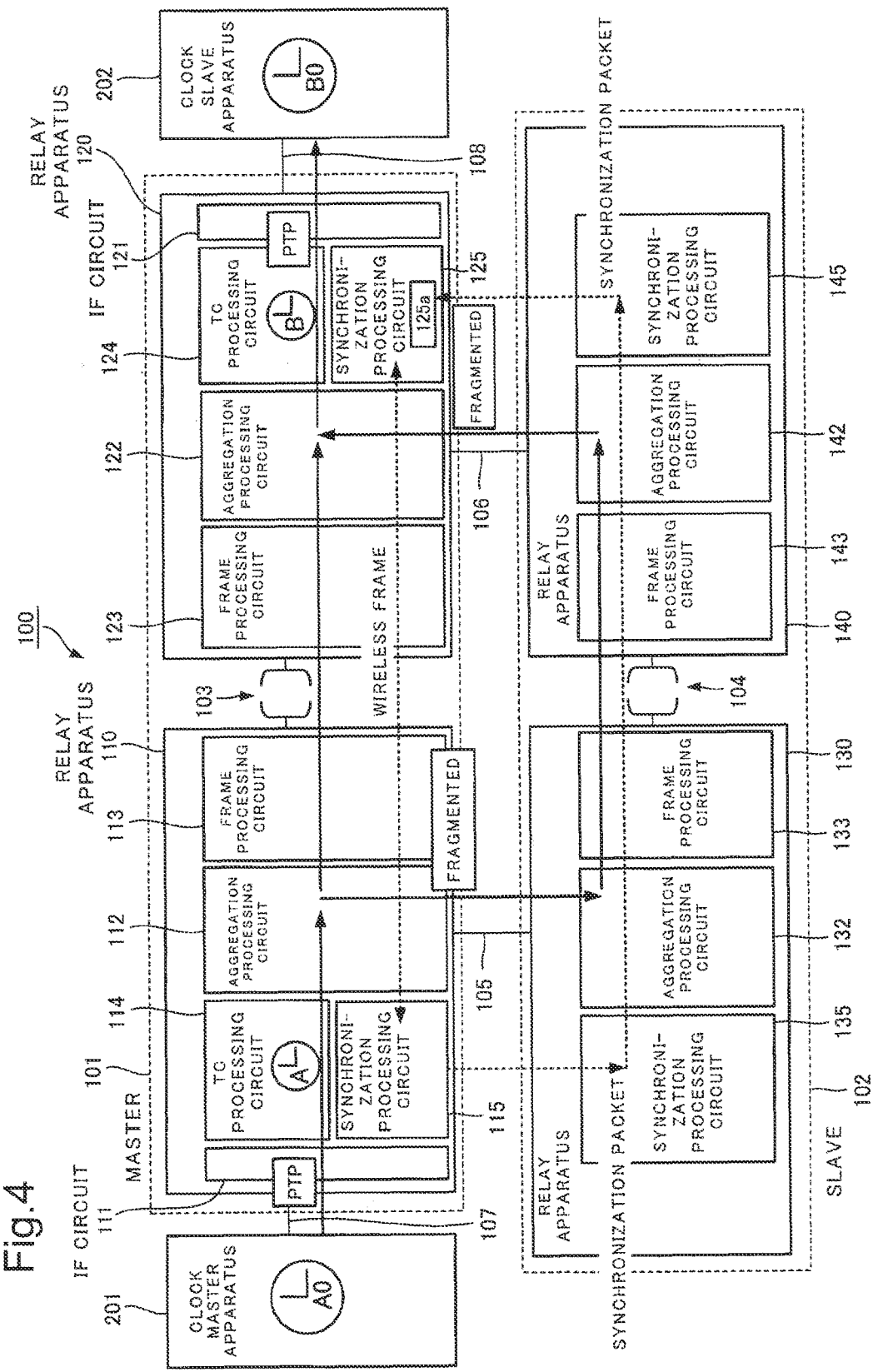
FIG. 4 is an illustration diagram for describing the operation of the communication system according to the first exemplary embodiment at normal times.

An operation of the communication system according to the present exemplary embodiment will be described using FIG. 3 to FIG. 6. FIG. 3 and FIG. 4 illustrate an operation at normal times, in which two wireless lines are used.

As illustrated in FIG. 3 and FIG. 4, at normal times, the relay apparatus 110 and the relay apparatus 120 transmit/receive a wireless frame via the wireless line 103, so that the timer A and the timer B are synchronized (S101). The synchronization processing circuit 115 of the relay apparatus 110 generates a synchronization pulse in synchronization with the operation timing of the timer A, multiplexes the generated synchronization pulse into the wireless frame, and regularly transmits the wireless frame to the relay apparatus 120. The synchronization processing circuit 125 of the relay apparatus 120 receives the wireless frame transmitted from the relay apparatus 120, obtains the synchronization pulse multiplexed into the received wireless frame, and matches (synchronizes) the timing of the obtained synchronization pulse with the operation timing of the timer B. For example, the synchronization pulse is a clear pulse that resets a timer. The relay apparatus 110 regularly transmits the wireless frame into which the synchronization pulse is multiplexed at a cycle capable of maintaining the synchronization accuracy (for example, nanoseconds level) defined in IEEE1588.

In addition, the relay apparatus 110 and the relay apparatus 120 transmit/receive a synchronization packet via the relay apparatus 130, the wireless line 104, and the relay apparatus 140 (S102). The synchronization processing circuit 115 of the relay apparatus 110 generates the synchronization packet in which a value of the timer A is written, and regularly transmits the generated synchronization packet to the relay apparatus 130 via the wire line 105. The synchronization processing circuit 135 of the relay apparatus 130 forwards the synchronization packet received from the relay apparatus 110 to the relay apparatus 140 via the wireless line 104, and furthermore, the synchronization processing circuit 145 of the relay apparatus 140 forwards the received synchronization packet to the relay apparatus 120 via the wire line 106. The synchronization processing circuit 125 of the relay apparatus 120 receives the synchronization packet via the relay apparatus 140, and stores in the register 125a a difference between a timer value of the received synchronization packet and a timer value of the timer B. Similarly to the wireless frame, the relay apparatus 110 regularly transmits the synchronization packet at a cycle capable of maintaining the synchronization accuracy (for example, nanoseconds level) defined in IEEE1588.

It is to be noted that, since the synchronization is performed using the wireless frame during receiving the wireless frame, the synchronization does not need to be performed using the synchronization packet, but the synchronization may be performed using the wireless frame and the synchronization packet. For example, at normal times, the synchronization may be performed using the timer value of the synchronization packet or the register 125a. In addition, the synchronization packet may be transmitted only when the wireless line is disconnected.

Subsequently, in a state where the wireless lines 103, 104 are communicable, when receiving a PTP packet (S103), the relay apparatus 110 updates the received PTP packet with the value of the timer A (S104). In the relay apparatus 110, the IF circuit 111 receives the PTP packet from the clock master apparatus 201 via the wire line 107, and the TC processing circuit 114 subtracts the value of the timer A from CorrectionField in the received PTP packet.

Subsequently, the relay apparatus 110 fragments the PTP packet into a plurality of fragmented packets (S105), and forwards the fragmented packets to the relay apparatus 120 via the wireless lines 103, 104 (S106), and the relay apparatus 120 unites the received fragmented packets (S107).

The aggregation processing circuit 112 of the relay apparatus 110 fragments the updated PTP packet into a plurality of fragmented packets, transmits a half of the fragmented packets from the frame processing circuit 113 to the relay apparatus 120 via the wireless line 103, and transmits the other half of the fragmented packets to the relay apparatus 130 via the wire line 105. It is to be noted that the number of the fragmented packets to be transmitted may be controlled depending on bands of the wireless lines 103, 104. The aggregation processing circuit 132 of the relay apparatus 130 receives the fragmented packets via the wire line 105, and transmits the received fragmented packets from the frame processing circuit 133 to the relay apparatus 140 via the wireless line 104. The aggregation processing circuit 142 of the relay apparatus 140 receives the fragmented packets from the frame processing circuit 143 via the wireless line 104, and transmits the received fragmented packets to the relay apparatus 120 via the wire line 106. The aggregation processing circuit 122 of the relay apparatus 120 receives the fragmented packets from the frame processing circuit 123 via the wireless line 103, and furthermore, receives the fragmented packets via the wire line 106, and unites the fragmented packets received via the wireless line 103 and the wire line 106 to restore the PTP packet.

Subsequently, the relay apparatus 120 updates the restored PTP packet with a value of the timer B (S108), and transmits the updated PTP packet at this timing (S109). The TC processing circuit 124 of the relay apparatus 120 adds the value of the timer B to CorrectionField in the PTP packet, and the IF circuit 121 transmits the added PTP packet to the clock slave apparatus 202 via the wire line 108.

Figure 5:
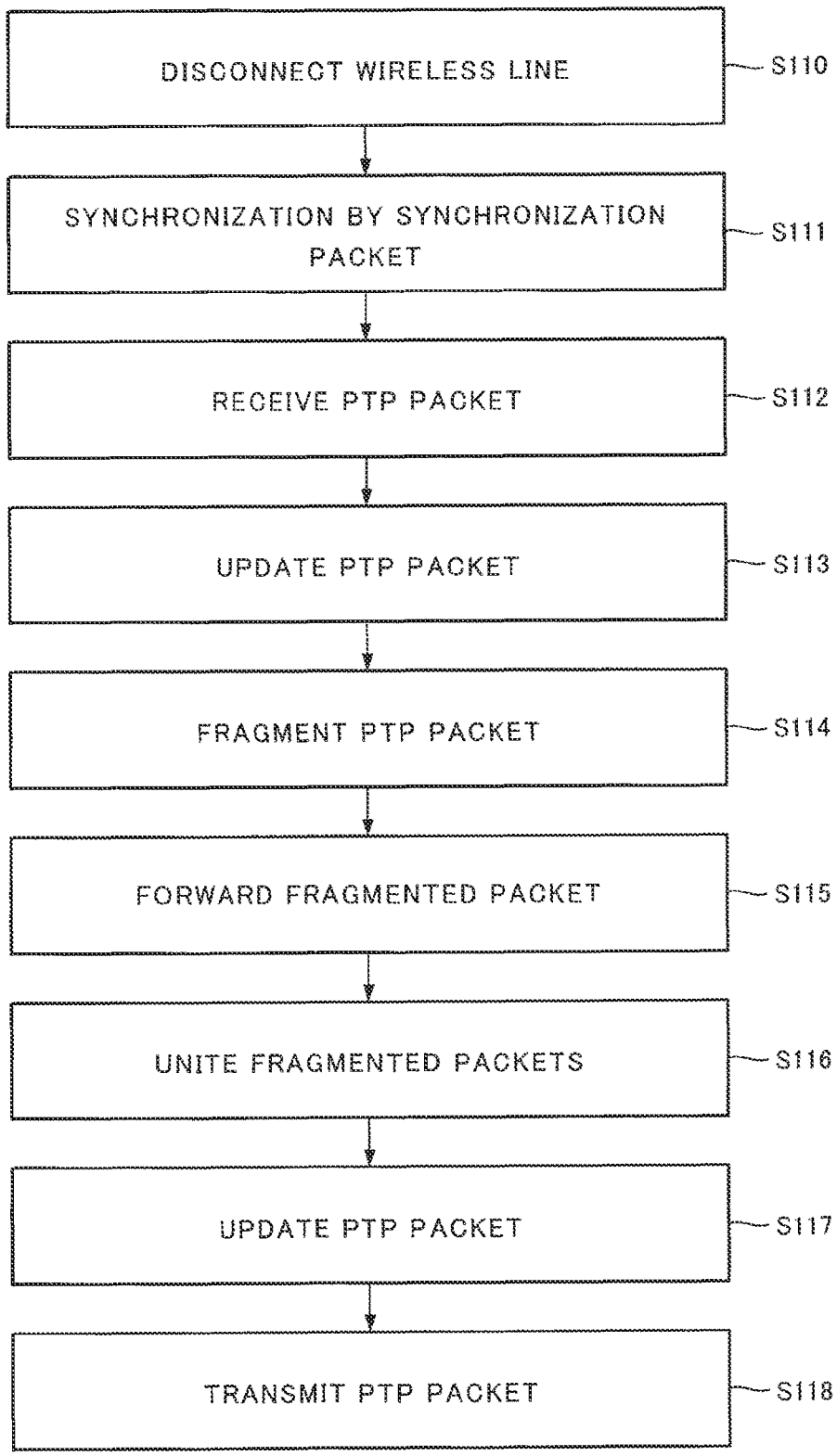
FIG. 5 is a flow chart illustrating an operation of the communication system according to the first exemplary embodiment during a failure.
Figure 6:
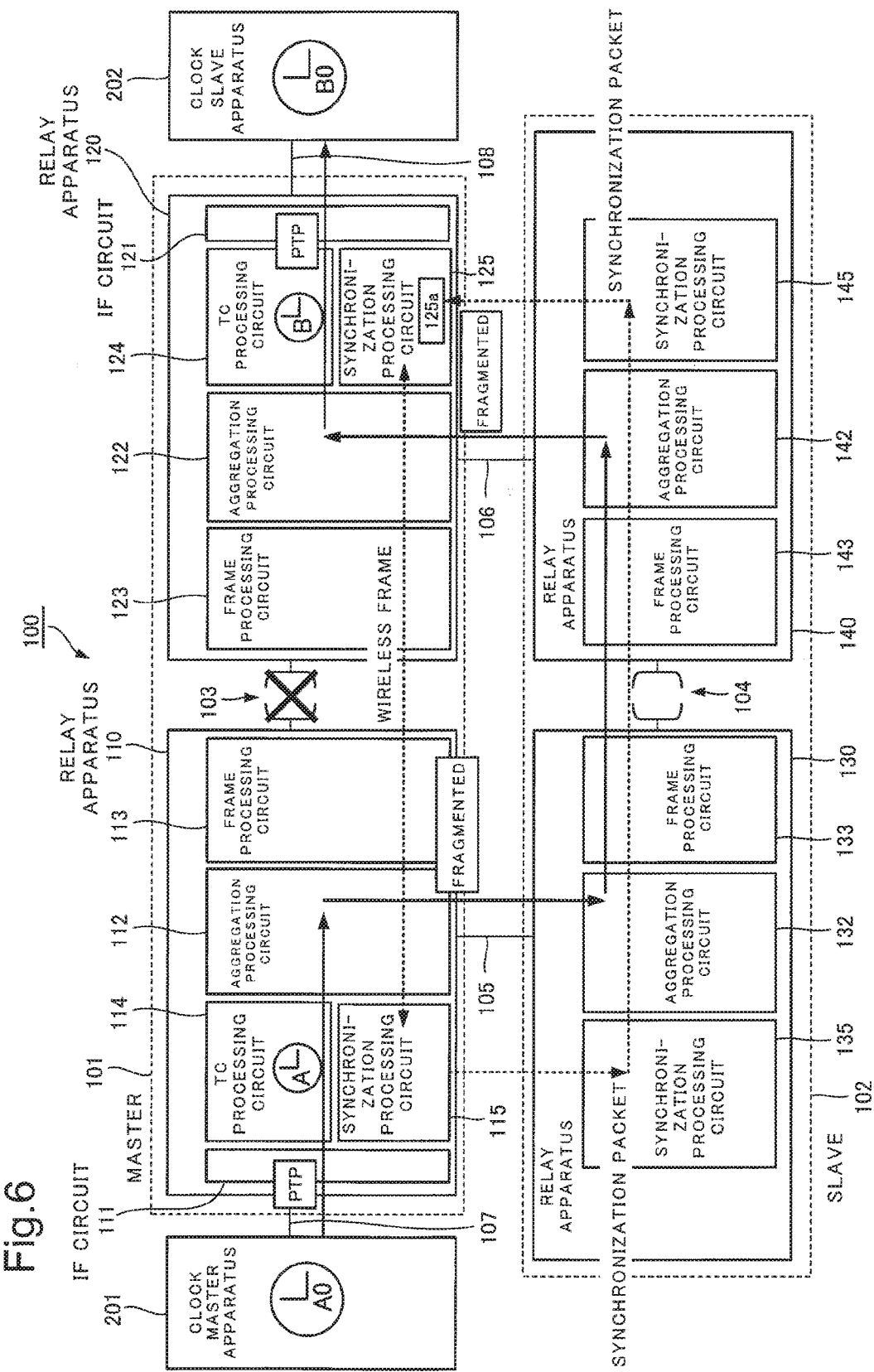
FIG. 6 is an illustration diagram for describing the operation of the communication system according to the first exemplary embodiment during a failure.

FIG. 5 and FIG. 6 illustrate an operation when a failure occurs in one wireless line. As illustrated in FIG. 5 and FIG. 6, when the wireless line 103 is disconnected (S110), that is, when communication via the wireless line 103 becomes impossible by occurrence of a failure or the like, the relay apparatus 120 performs the time synchronization using the synchronization packet (S111). Since the synchronization using the wireless frame cannot be performed due to the disconnection of the wireless line 103, the synchronization processing circuit 125 performs the time synchronization using the synchronization packet received via the relay apparatus 130, the wireless line 104, and the relay apparatus 140. The synchronization processing circuit 125 synchronizes the timer B with the timer A by subtracting the value stored in the register 125a from the timer value of the received synchronization packet and setting the subtracted value in the timer B. By using the value of the register 125a, the synchronization can be performed with accuracy similar to that when the wireless line 103 is connected.

After that, when the PTP packet is received, the PTP packet is forwarded via only the wireless line 104. The processing at this time is basically the same as S103 to S109. More specifically, when receiving the PTP packet (S112), the relay apparatus 110 updates the received PTP packet with the value of the timer A (S113). The relay apparatus 110 fragments the PTP packet into a plurality of fragmented packets (S114), and forwards the fragmented packets to the relay apparatus 120 via the relay apparatus 130, the wireless line 104, and the relay apparatus 140 (S115), and the relay apparatus 120 unites the received fragmented packets (S116). The relay apparatus 120 updates the restored PTP packet with the value of the timer B synchronized in S111 (S117), and transmits the updated PTP packet at this timing (S118).

As described above, in the present exemplary embodiment, between the relay apparatuses, the synchronization processing is performed by the wireless frame via the wireless line on the master side, and the synchronization processing is performed by the synchronization packet via the pathway on the slave side. Accordingly, even when the communication of the wireless line on the master side becomes impossible, the synchronization processing can be performed using the synchronization packet. Therefore, in the relay apparatus, an accurate time can be written in the PTP packet, and thus, the time synchronization of the TC function can be performed with high precision.

Second Exemplary Embodiment

Hereinafter, a second exemplary embodiment will be described with reference to the drawings. The present exemplary embodiment is an example in which synchronization is performed using timers in the relay apparatuses on the slave side, in contrast to the first exemplary embodiment.

Figure 7:
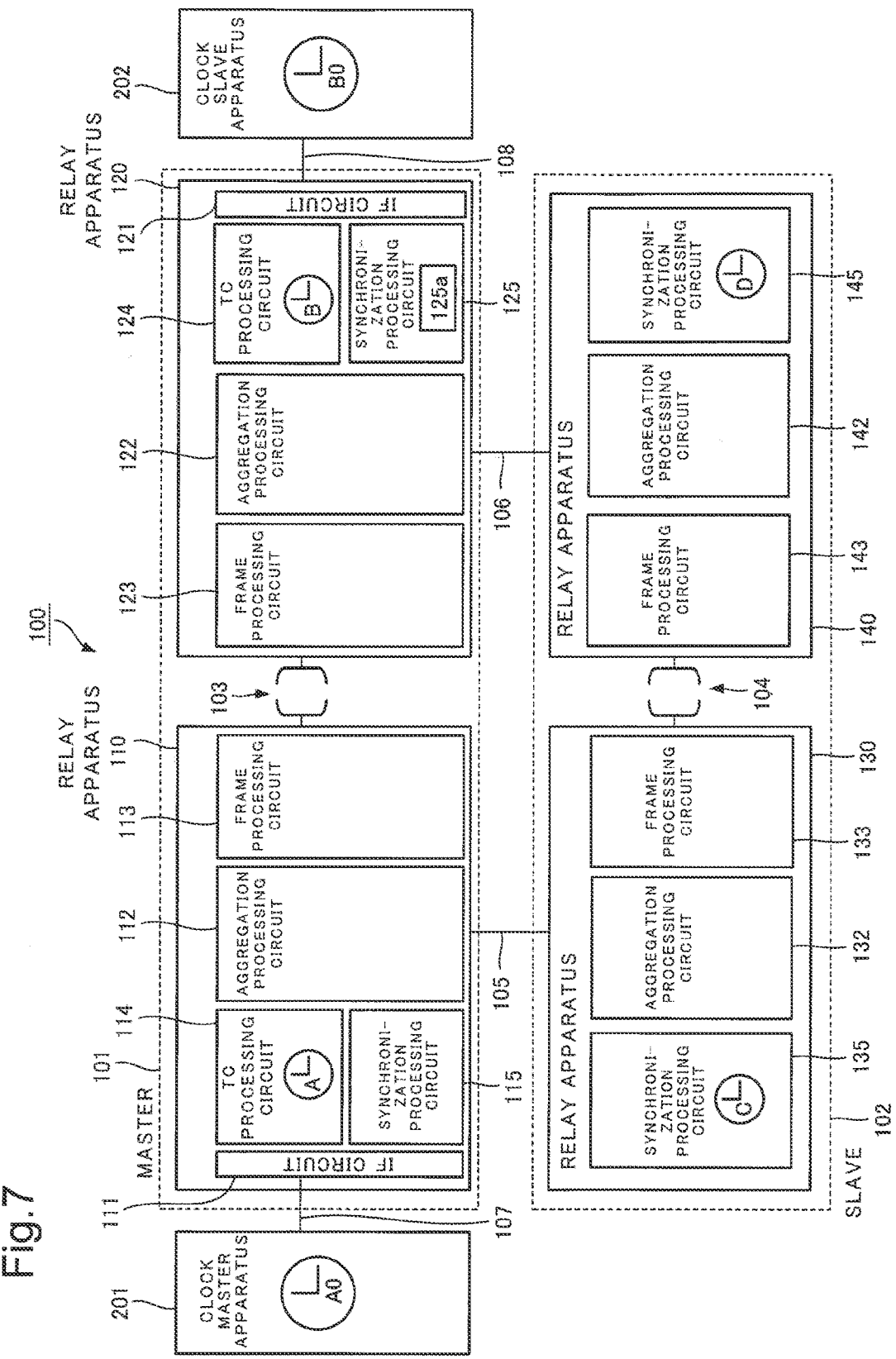
FIG. 7 is a configuration diagram illustrating a configuration of a communication system according to a second exemplary embodiment.

FIG. 7 illustrates a configuration of the communication system 100 according to the second exemplary embodiment. In FIG. 7, the synchronization processing circuit 135 of the relay apparatus 130 includes a timer C, and the synchronization processing circuit 145 of the relay apparatus 140 includes a timer D, in contrast to FIG. 2 of the first exemplary embodiment. The timer C is a third clock unit that counts a third time, and the timer D is a fourth clock unit that counts a fourth time. In the present exemplary embodiment, the timer C is synchronized with the timer A, the timer D is synchronized with the timer C, and the timer B is synchronized with the timer A or the timer D.

The synchronization processing circuit (third time synchronization unit) 135 executes time synchronization processing together with the relay apparatus 140, and executes time synchronization processing together with the relay apparatus 110. The synchronization processing circuit 135 synchronizes the timer C with the timer D by multiplexing a synchronization pulse into a wireless frame of the wireless line 104. In addition, the synchronization processing circuit 135 synchronizes the timer A with the timer C using a synchronization packet received from the relay apparatus 110.

The synchronization processing circuit (fourth time synchronization unit) 145 executes time synchronization processing together with the relay apparatus 130, and executes time synchronization processing together with the relay apparatus 120. The synchronization processing circuit 145 synchronizes the timer D with the timer C by obtaining the synchronization pulse from the wireless frame received via the wireless line 104. In addition, the synchronization processing circuit 145 synchronizes the timer D with the timer B by transmitting the synchronization packet to the relay apparatus 120.

Figure 8:
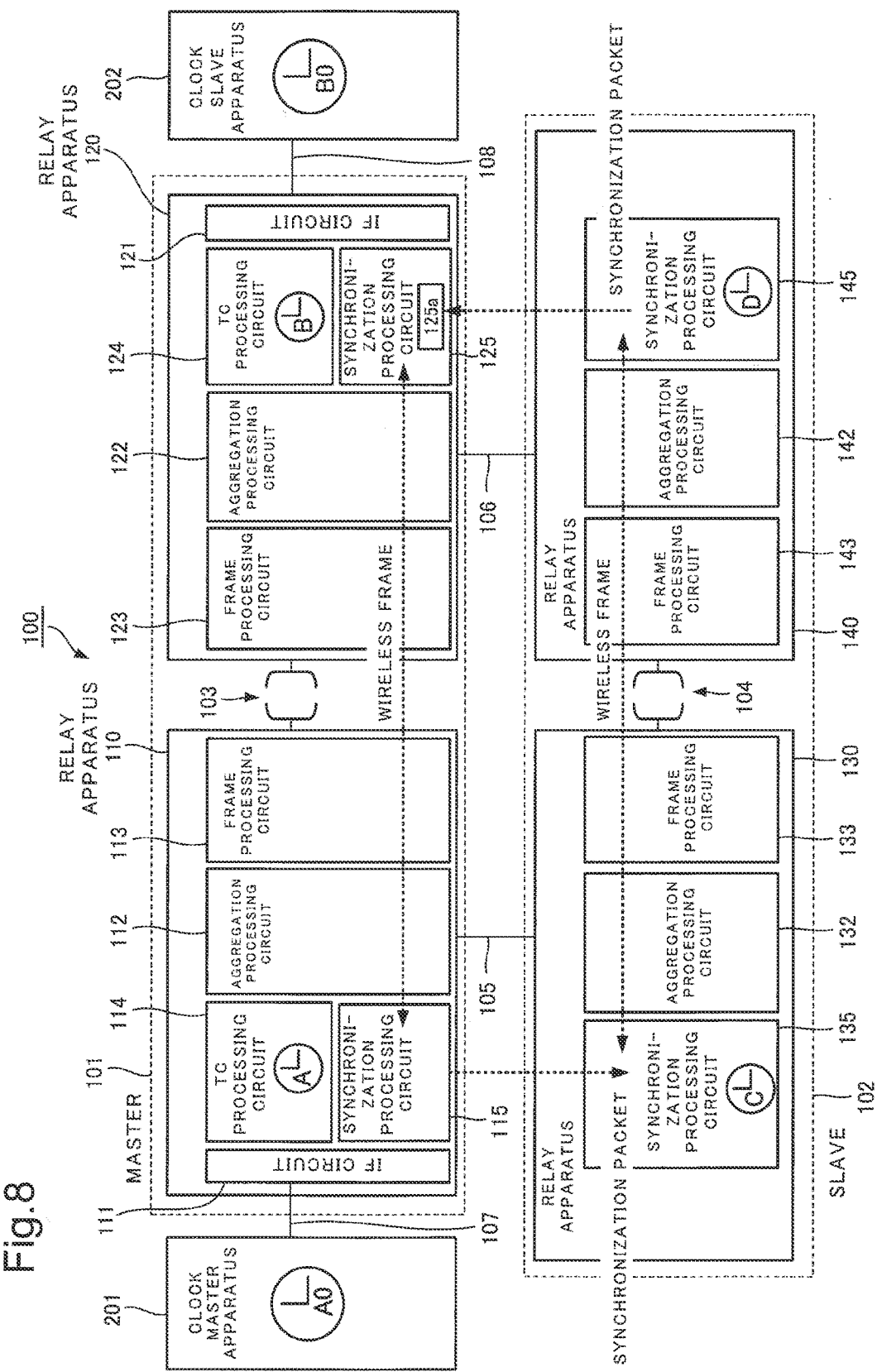
FIG. 8 is an illustration diagram for describing an operation of the communication system according to the second exemplary embodiment at normal times.

FIG. 8 illustrates an operation at normal times, in which two wireless lines are used. Similarly to the first exemplary embodiment, at normal times, the relay apparatus 110 and the relay apparatus 120 transmit/receive the wireless frame via the wireless line 103, so that the timer A and the timer B are synchronized. Similarly to the relay apparatus 110 and the relay apparatus 120, the relay apparatus 130 and the relay apparatus 140 transmit/receive the wireless frame via the wireless line 104, so that the timer C and the timer D are synchronized.

In addition, the relay apparatus 110 and the relay apparatus 130 transmit/receive the synchronization packet, so that the timer A and the timer C are synchronized. The synchronization processing circuit 135 of the relay apparatus 130 synchronizes the timer C with the timer A by receiving the synchronization packet via the wire line 105 and setting a timer value of the received synchronization packet in the timer C.

In addition, the relay apparatus 140 and the relay apparatus 120 transmit/receive the synchronization packet. The synchronization processing circuit 145 of the relay apparatus 140 generates the synchronization packet in which a value of the timer D is written, and regularly transmits the generated synchronization packet to the relay apparatus 120 via the wire line 106. Similarly to the first exemplary embodiment, the synchronization processing circuit 125 of the relay apparatus 120 stores in the register 125a a difference between a timer value of the received synchronization packet and a timer value of the timer B.

It is to be noted that the forwarding operation of the PTP packet at normal times and the operation during a failure of the wireless line are the same as those in the first exemplary embodiment.

As described above, in the present exemplary embodiment, the relay apparatuses on the master side include the timers, and the synchronization is performed between the respective timers of the relay apparatuses. Accordingly, the time synchronization accuracy between the respective relay apparatuses is improved, and thus, when the communication of the wireless line on the master side becomes impossible, the time synchronization can be performed with higher precision.

Third Exemplary Embodiment

Hereinafter, a third exemplary embodiment will be described with reference to the drawing. In the present exemplary embodiment, transmission timing control of the synchronization packet and the fragmented packet in the configuration of the first exemplary embodiment or the second exemplary embodiment will be described.

Figure 9:
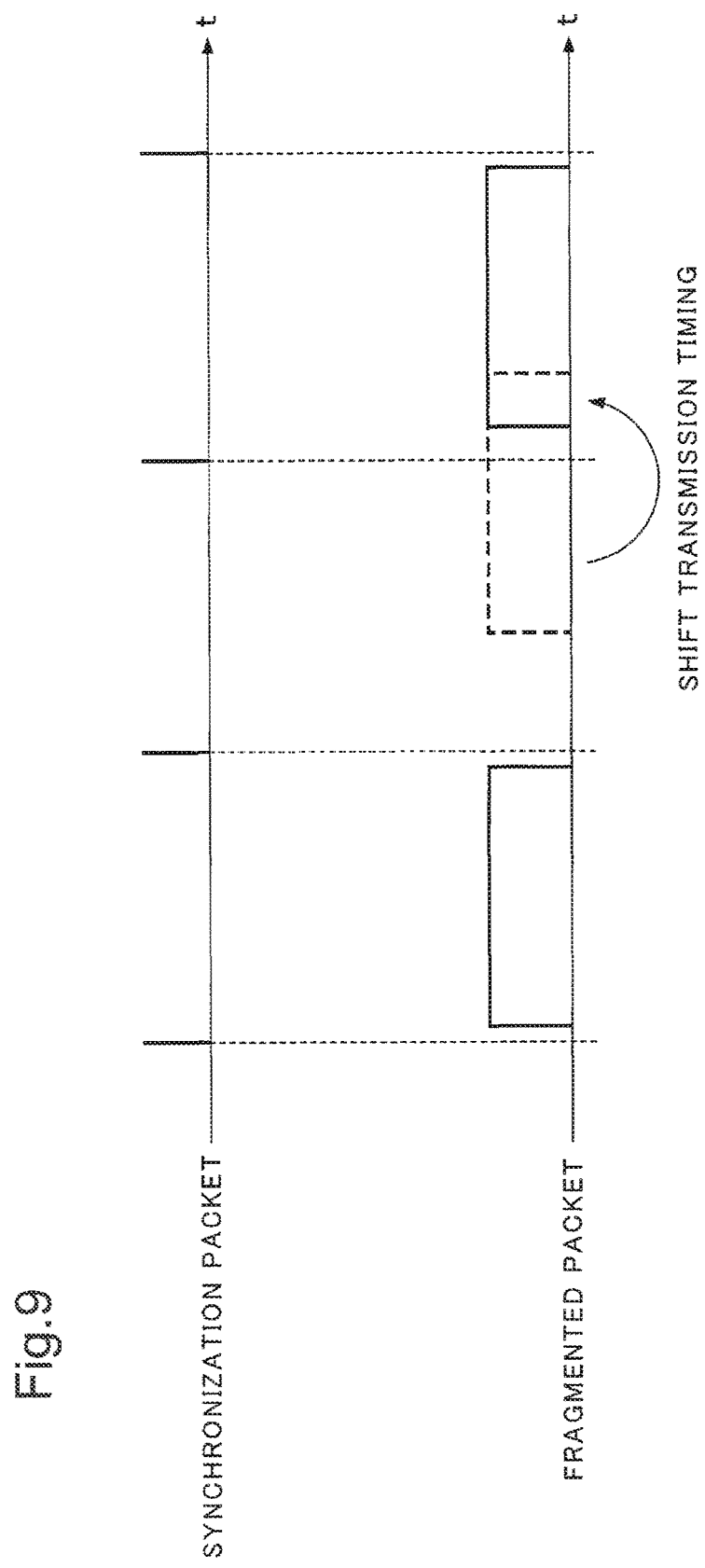
FIG. 9 is an illustration diagram for describing a packet transmitting operation of a communication system according to a third exemplary embodiment.

The relay apparatus 110 transmits the synchronization packet, and transmits the fragmented packets obtained by fragmenting the PTP packet or the forward packet to the relay apparatus 130 via the wire line 105. As illustrated in FIG. 9, the synchronization processing circuit 115 of the relay apparatus 110 regularly transmits the synchronization packet to the wire line 105. The synchronization packet needs to be consistently and regularly transmitted for maintaining the time synchronization accuracy between the timers.

Therefore, the aggregation processing circuit 112 of the relay apparatus 110 transmits the fragmented packet while avoiding the transmission timing of the synchronization packet. When being about to transmit the fragmented packet, if the transmission timing of the fragmented packet overlaps with the transmission timing of the synchronization packet, the aggregation processing circuit 112 transmits the fragmented packet after the completion of the transmission of the synchronization packet. For example, the fragmented packet is transmitted so as not to overlap with the transmission timing of the synchronization packet between the transmission start and the transmission completion of the fragmented packet. Time required for the transmission of the fragmented packet can be obtained by a fragmented packet length and a forwarding side. A transmission interval of the synchronization packet is at least longer than the time required for the transmission of the fragmented packet (the time required for the transmission of the fragmented packet is shorter than the transmission interval of the synchronization packet). It is to be noted that the same is true of the transmission timing of the synchronization packet and the fragmented packet from the relay apparatus 140 to the relay apparatus 120.

As described above, in the present exemplary embodiment, the fragmented packet is transmitted while avoiding the transmission timing of the synchronization packet. Accordingly, the synchronization packet and the fragmented packet are prevented from overlapping, and the synchronization packet can be consistently and regularly transmitted, and thus, the time synchronization by the synchronization packet can be performed with higher precision.

Fourth Exemplary Embodiment

Hereinafter, a fourth exemplary embodiment will be described with reference to the drawing. In the present exemplary embodiment, the relay apparatuses on the master side and the relay apparatuses on the slave side are connected by two communication lines in the configuration of the first exemplary embodiment or the second exemplary embodiment.

Figure 10:
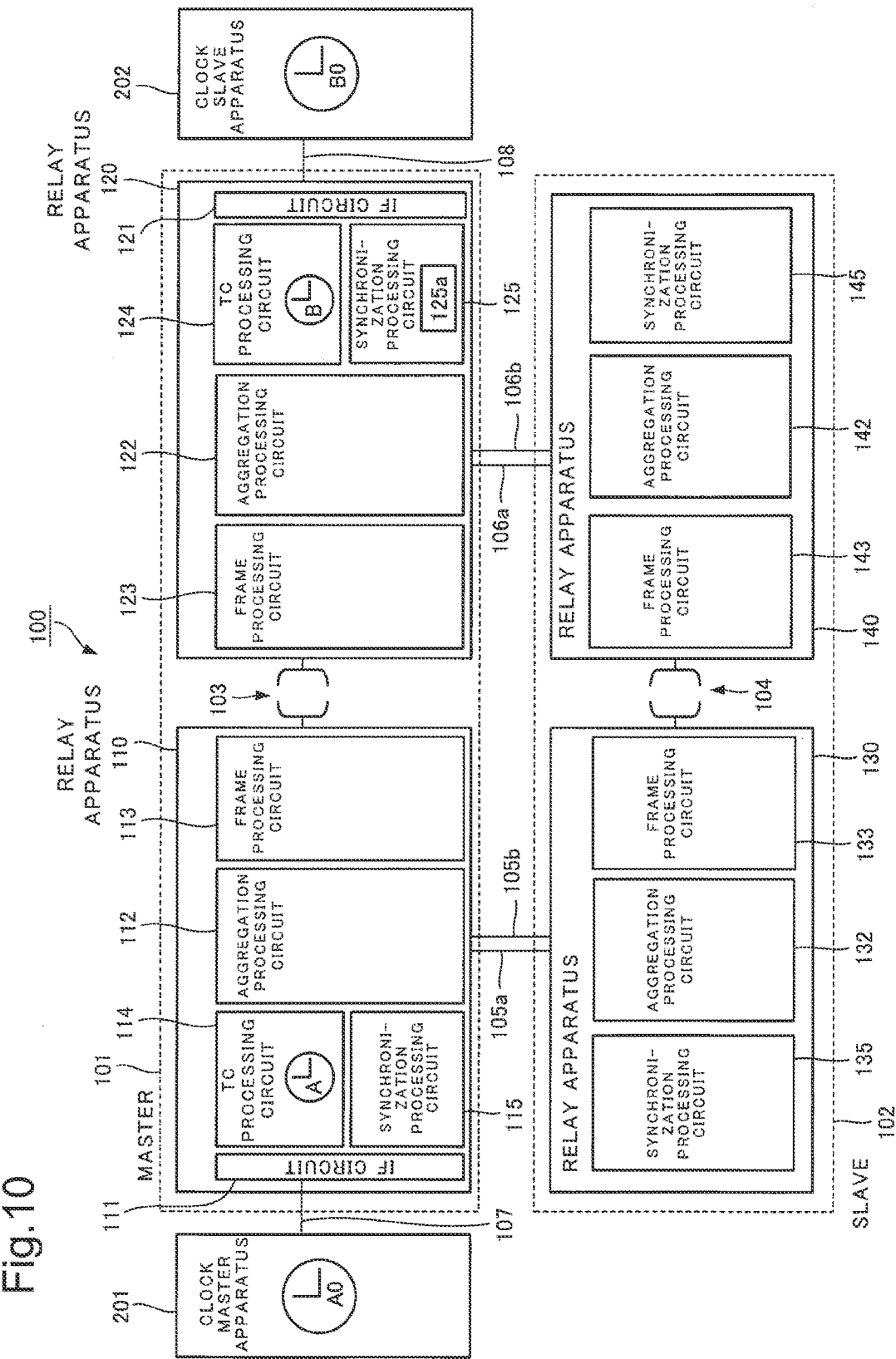
FIG. 10 is a configuration diagram illustrating a configuration of a communication system according to a fourth exemplary embodiment.

FIG. 10 illustrates an outline configuration of a communication system according to the present exemplary embodiment. Internal configurations of the respective relay apparatuses are the same as those in the first exemplary embodiment or the second exemplary embodiment. As illustrated in FIG. 10, the relay apparatus 110 and the relay apparatus 130 are connected via wire lines 105a, 105b, and the relay apparatus 120 and the relay apparatus 140 are connected via wire lines 106a, 106b. It is to be noted that imaginary logical lines may be used without limiting to physical lines such as the wire lines.

One of the wire line 105a and the wire line 105b is a line for transmitting the synchronization packet, and the other is a line for transmitting the fragmented packet. The same is true of the wire lines 106a, 106b. For example, the relay apparatus 110 regularly transmits the synchronization packet via the wire line 105a, and transmits the fragmented packet via the wire line 105b. In addition, the relay apparatus 140 regularly transmits the synchronization packet via the wire line 106a, and transmits the fragmented packet via the wire line 106b.

As described above, the communication line for transmitting the synchronization packet and the communication line for transmitting the fragmented packet are separated lines, so that the synchronization packet and the fragmented packet can be easily prevented from overlapping. Therefore, similarly to the third exemplary embodiment, the synchronization packet can be consistently and regularly transmitted, and thus, the time synchronization by the synchronization packet can be performed with higher precision.

Fifth Exemplary Embodiment

Hereinafter, a fifth exemplary embodiment will be described with reference to the drawing. In the second exemplary embodiment, the timer B to the timer D are synchronized with the timer A using the timer A of the relay apparatus 110 as a standard, but another timer may be used as a standard. In the present exemplary embodiment, the timer C of the relay apparatus 130 is used as a standard. More specifically, the timer A is synchronized with the timer C, the timer D is synchronized with the timer C, and the timer B is synchronized with the timer A or the timer D.

Figure 11:
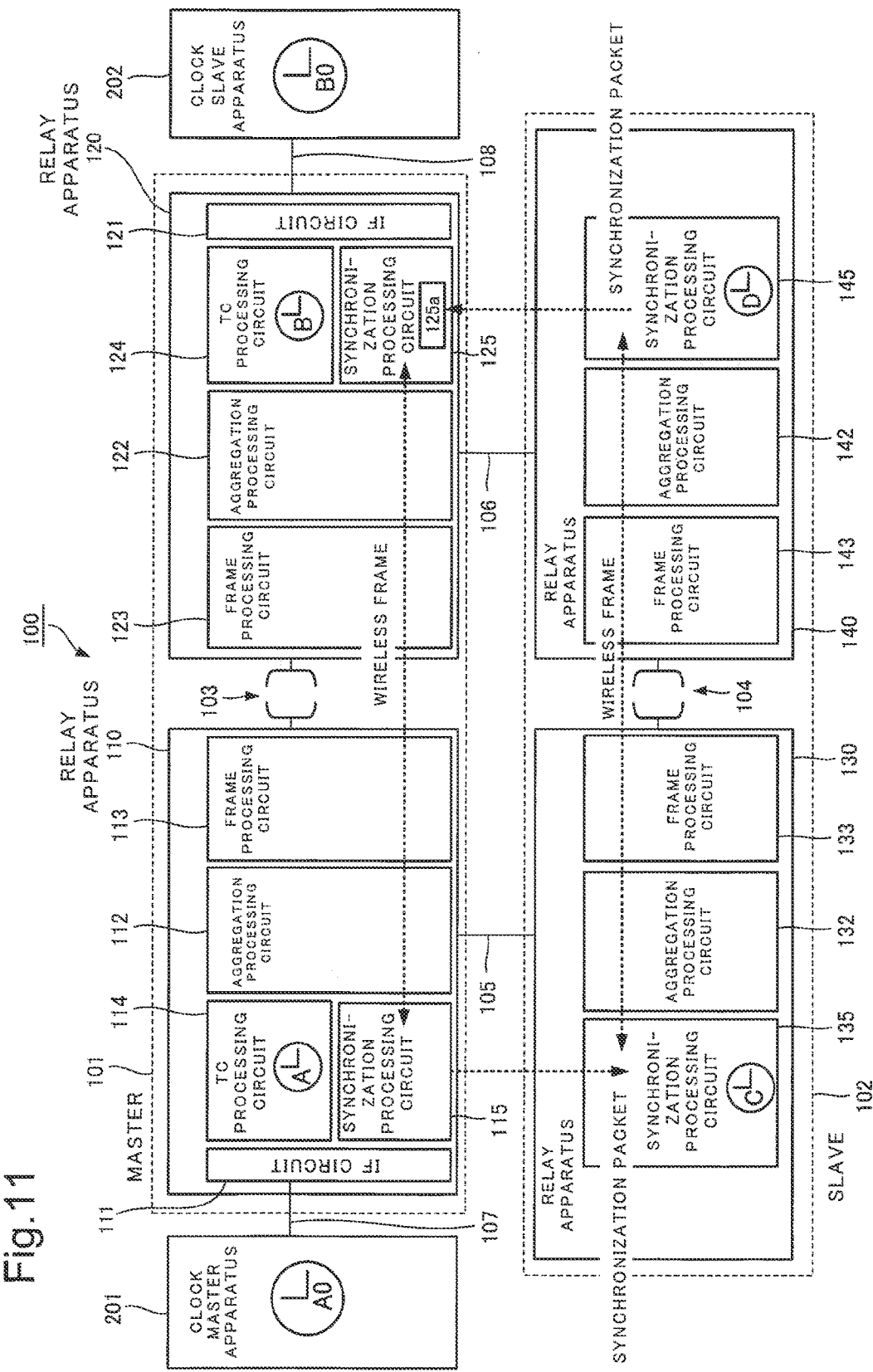
FIG. 11 is a configuration diagram illustrating a configuration of a communication system according to a fifth exemplary embodiment.

FIG. 11 illustrates a configuration of a communication system according to the present exemplary embodiment. FIG. 11 has the same configuration as FIG. 7 of the second exemplary embodiment, and differs mainly in a synchronization operation between the relay apparatuses. The synchronization between the relay apparatus 110 and the relay apparatus 120 by the wireless frame and the synchronization between the relay apparatus 130 and the relay apparatus 140 by the wireless frame are the same as those in the second exemplary embodiment. In addition, the transmission of the synchronization packet from the relay apparatus 140 to the relay apparatus 120 is also the same as that in the second exemplary embodiment.

In the present exemplary embodiment, the synchronization packet is transmitted from the relay apparatus 130 to the relay apparatus 110, so that the timer C and the timer A are synchronized. The synchronization processing circuit 135 of the relay apparatus 130 generates the synchronization packet in which a value of the timer C is written, and transmits the generated synchronization packet to the relay apparatus 110 via the wire line 105. The synchronization processing circuit 115 of the relay apparatus 110 synchronizes the timer A with the timer C by receiving the synchronization packet via the wire line 105 and setting a timer value of the received synchronization packet in the timer A.

As described above, the timer C of the relay apparatus 130 may be used as a standard, so that the timer A is synchronized with the timer C. Even when the timer other than the timer A is used as a standard, the time synchronization can be performed with high precision, similarly to the second exemplary embodiment.

Sixth Exemplary Embodiment

Hereinafter, a sixth exemplary embodiment will be described with reference to the drawing. In the second exemplary embodiment, the relay apparatus 110 is used as an input apparatus of a packet and the relay apparatus 120 is used as an output apparatus of a packet, but either the relay apparatus 110 or the relay apparatus 130 may be used as the input apparatus and either the relay apparatus 120 or the relay apparatus 140 may be used as the output apparatus. In the present exemplary embodiment, the relay apparatus 110 is used as the input apparatus and the relay apparatus 140 is used as the output apparatus. In the present exemplary embodiment, the timer C is synchronized with the timer A, the timer B is synchronized with the timer A, and the timer D is synchronized with the timer C or the timer B.

Figure 12:
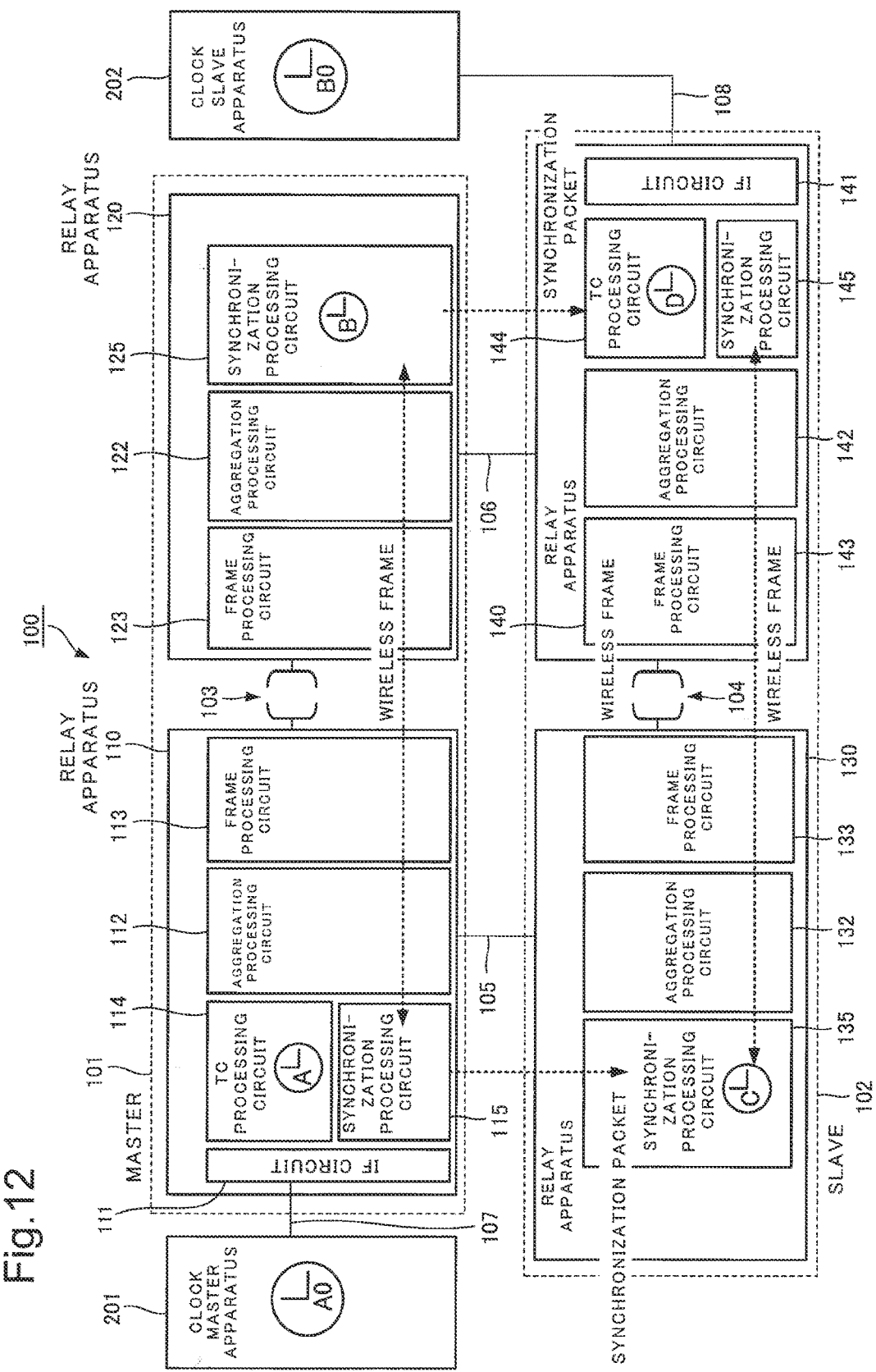
FIG. 12 is a configuration diagram illustrating a configuration of a communication system according to a sixth exemplary embodiment.

FIG. 12 illustrates a configuration of a communication system according to the present exemplary embodiment. The relay apparatus 140 includes an IF circuit 141 and a TC processing circuit 144, in contrast to FIG. 7 of the second exemplary embodiment. In the relay apparatus 120, the IF circuit 121 and the TC processing circuit 124 are unnecessary.

The IF circuit 141 of the relay apparatus 140 transmits the PTP packet or another forward packet to the clock slave apparatus 202 via the wire line 108. The TC processing circuit 144 updates the PTP packet by a value of the timer D.

The synchronization between the relay apparatus 110 and the relay apparatus 120 by the wireless frame and the synchronization between the relay apparatus 130 and the relay apparatus 140 by the wireless frame are the same as those in the second exemplary embodiment. In addition, the transmission of the synchronization packet from the relay apparatus 110 to the relay apparatus 130 is also the same as that in the second exemplary embodiment.

In the present exemplary embodiment, the synchronization packet is transmitted/received from the relay apparatus 120 to the relay apparatus 140, so that the timer B and the timer D are synchronized. The synchronization processing circuit 125 of the relay apparatus 120 generates the synchronization packet in which a value of the timer B is written, and transmits the generated synchronization packet to the relay apparatus 140 via the wire line 106. The synchronization processing circuit 145 of the relay apparatus 140 synchronizes the timer D with the timer B by receiving the synchronization packet via the wire line 106 and setting a timer value of the received synchronization packet in the timer D.

Since the pathway via the relay apparatus 120 from the relay apparatus 110 and the pathway via the relay apparatus 130 from the relay apparatus 110 have the same delay at normal times, the relay apparatus 140 may perform the synchronization using the synchronization packet or the wireless frame from either the relay apparatus 120 or the relay apparatus 140. In addition, since the both pathways have the same delay, a register for storing a difference is unnecessary.

In addition, at normal times, the relay apparatus 110 receives the PTP packet, updates the PTP packet by a value of the timer A, and transmits the fragmented packets to the relay apparatus 140 via the relay apparatus 120 and the relay apparatus 130. The relay apparatus 140 receives the fragmented packets from the relay apparatus 120 and the relay apparatus 130, restores the PTP packet, updates the PTP packet by the value of the timer D, and transmits the PTP packet.

When the wireless line is disconnected, the relay apparatus 140 performs the time synchronization by a communicable pathway. When the wireless line 103 is disconnected, the relay apparatus 140 performs the synchronization by the wireless frame received from the relay apparatus 130. In addition, the relay apparatus 110 receives the PTP packet, updates the PTP packet by the value of the timer A, and transmits the fragmented packets to the relay apparatus 140 via only the relay apparatus 130. The relay apparatus 140 receives the fragmented packets only from the relay apparatus 130, restores the PTP packet, updates the PTP packet by the value of the timer D, and transmits the PTP packet.

As described above, the relay apparatus 140 may be used as the output apparatus of the PTP packet or the forward packet. Even when the relay apparatus other than the relay apparatus 120 is used as the output apparatus, the time synchronization can be performed with high precision, similarly to the second exemplary embodiment. In addition, the amount of delay of the pathway on the master side and the amount of delay of the pathway on the slave side can be approximately equalized.

Seventh Exemplary Embodiment

Hereinafter, a seventh exemplary embodiment will be described with reference to the drawing. Although the configuration of only the downstream direction has been described in the second exemplary embodiment, a configuration including an upstream direction will be described in the present exemplary embodiment.

Figure 13:
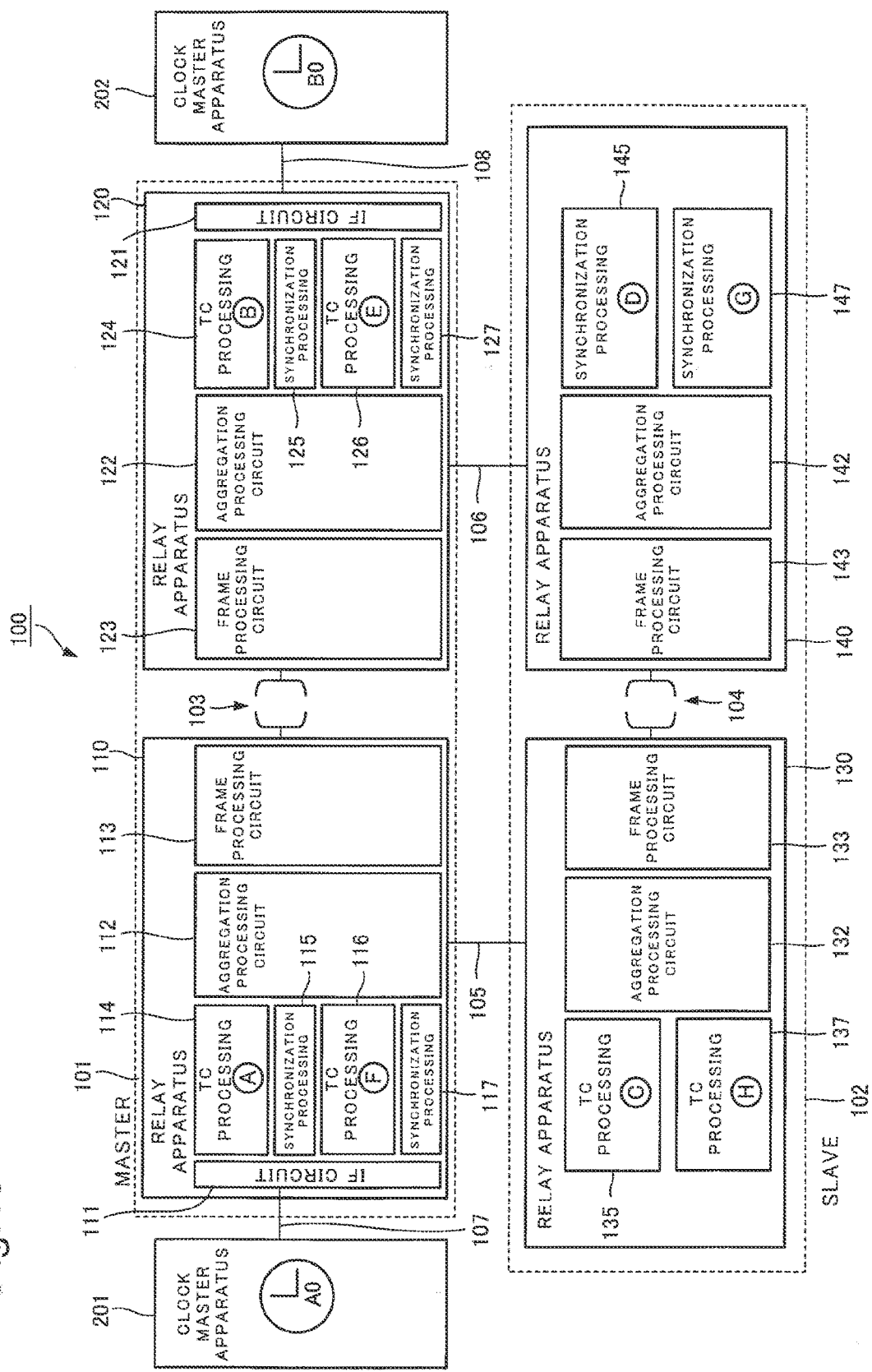
FIG. 13 is a configuration diagram illustrating a configuration of a communication system according to a seventh exemplary embodiment.

FIG. 13 illustrates a configuration of a communication system according to the present exemplary embodiment. In FIG. 13, in addition to the configuration of FIG. 7 of the second exemplary embodiment, the relay apparatus 110 includes a TC processing circuit 116 and a synchronization processing circuit 117, the relay apparatus 120 includes a TC processing circuit 126 and a synchronization processing circuit 127, the relay apparatus 130 includes a synchronization processing circuit 137, and the relay apparatus 140 includes a synchronization processing circuit 147.

The IF circuit 121 of the relay apparatus 120 receives a PTP packet from the clock slave apparatus 202 via the wire line 108. The TC processing circuit 126 has a timer E, and updates CorrectionField in the PTP packet on the basis of a value of the timer E when receiving the PTP packet. The synchronization processing circuit 127 synchronizes the timer E with a timer F by multiplexing a synchronization pulse into a wireless frame of the wireless line 103. In addition, the synchronization processing circuit 127 synchronizes the timer E with a timer G using a synchronization packet to be transmitted via the wire line 106.

The synchronization processing circuit 147 of the relay apparatus 140 synchronizes the timer G with a timer H by multiplexing a synchronization pulse into a wireless frame of the wireless line 104. In addition, the synchronization processing circuit 147 synchronizes the timer G with the timer E using the synchronization packet received from the relay apparatus 120.

The synchronization processing circuit 137 of the relay apparatus 130 synchronizes the timer H with the timer G by obtaining the synchronization pulse from the wireless frame received via the wireless line 104. In addition, the synchronization processing circuit 137 synchronizes the timer H with the timer F using the synchronization packet to be transmitted via the wire line 105.

The TC processing circuit 116 of the relay apparatus 110 has the timer F, and updates CorrectionField in the PTP packet on the basis of a value of the timer F when transmitting the PTP packet. The IF circuit 111 transmits the updated PTP packet to the clock master apparatus 201 via the wire line 107.

The synchronization processing circuit 117 synchronizes the timer F with the timer E by obtaining the synchronization pulse from the wireless frame received via the wireless line 103. The synchronization processing circuit 117 has a register (not illustrated), and stores in the register a difference between a timer value in the received synchronization packet and a timer value of the timer F.

The operation in the upstream direction in the present exemplary embodiment is opposite in direction from the operation in the downstream direction, and is basically the same as that in the second exemplary embodiment.

As described above, in addition to the configuration of the second exemplary embodiment, the configuration of the upstream direction similar to that of the downstream direction is included, so that the time synchronization can be performed with high precision including the upstream direction. In addition, by using a timer on the transmission source side as a standard, other timers are synchronized, and thus, a timer value on the transmission destination side is at least delayed compared to a timer value on the transmission source side. In a configuration in which the same timers are used in the upstream direction and the downstream direction, errors due to the delay occur in timer values. Each of the apparatuses includes separate timers (clocks) for the upstream direction and the downstream direction, so that a timer value multiplexed into the PTP packet on the transmission source side and a timer value multiplexed into the PTP packet on the transmission destination side can be made to be more accurate values.

Eighth Exemplary Embodiment

Hereinafter, an eighth exemplary embodiment will be described with reference to the drawing. In the seventh exemplary embodiment, in the configuration corresponding to the upstream and downstream directions, the relay apparatus 110 is used as the input apparatus in the downstream direction and the output apparatus in the upstream direction, and the relay apparatus 120 is used as the output apparatus in the downstream direction and the input apparatus in the upstream direction. In the present exemplary embodiment, the relay apparatus 110 is used as the input apparatus in the downstream direction, the relay apparatus 120 is used as the output apparatus in the downstream direction, the relay apparatus 140 is used as the input apparatus in the upstream direction, and the relay apparatus 130 is used as the output apparatus in the upstream direction.

Figure 14:
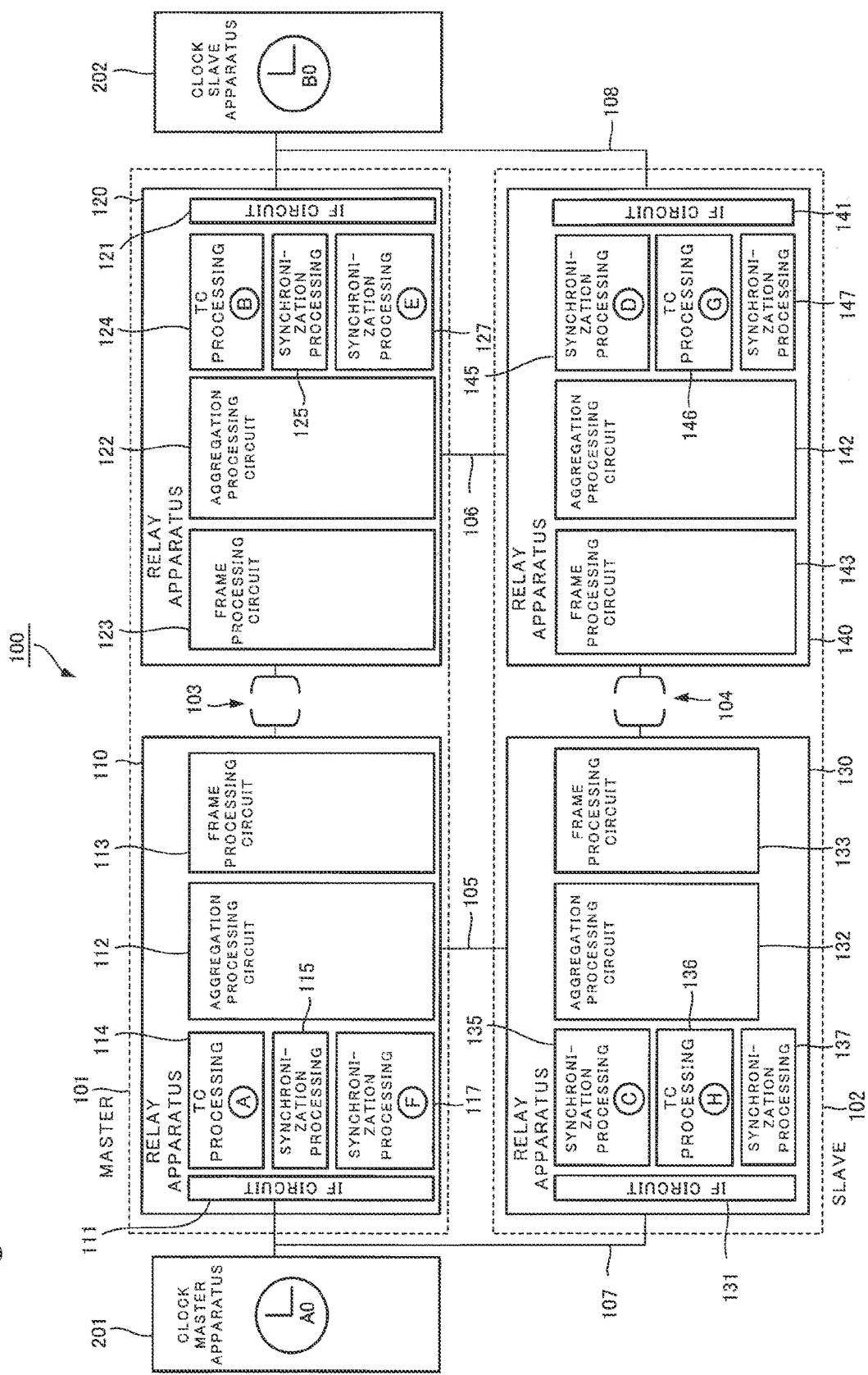
FIG. 14 is a configuration diagram illustrating a configuration of a communication system according to an eighth exemplary embodiment.

FIG. 14 illustrates a configuration of a communication system according to the present exemplary embodiment. In FIG. 14, in addition to the configuration of FIG. 13 of the seventh exemplary embodiment, the relay apparatus 130 includes an IF circuit 131 and a TC processing circuit 136, and the relay apparatus 140 includes an IF circuit 141 and a TC processing circuit 146. In the relay apparatus 110, the TC processing circuit 116 is unnecessary, and in the relay apparatus 120, the TC processing circuit 126 is unnecessary.

The IF circuit 141 of the relay apparatus 140 receives a PTP packet from the clock slave apparatus 202 via the wire line 108. The TC processing circuit 146 has the timer G, and updates CorrectionField in the PTP packet on the basis of a value of the timer E when receiving the PTP packet. The synchronization processing circuit 147 synchronizes the timer G with the timer E using a synchronization packet to be transmitted via the wire line 106. The synchronization processing circuit 127 of the relay apparatus 120 synchronizes the timer G with the timer E using the synchronization packet received from the relay apparatus 140. The synchronization between the relay apparatus 140 and the relay apparatus 130 and the synchronization between the relay apparatus 120 and the relay apparatus 110 are performed using the wireless frames, similarly to the seventh exemplary embodiment.

The TC processing circuit 136 of the relay apparatus 130 has the timer H, and updates CorrectionField in the PTP packet on the basis of a value of the timer H when transmitting the PTP packet. The IF circuit 131 transmits the updated PTP packet to the clock master apparatus 201 via the wire line 107.

The synchronization processing circuit 117 of the relay apparatus 110 synchronizes the timer F with the timer H using a synchronization packet to be transmitted via the wire line 105. The synchronization processing circuit 137 of the relay apparatus 130 has a register (not illustrated), and stores in the register a difference between a timer value in the received synchronization packet and a timer value of the timer H.

In the present exemplary embodiment, the operation in the downstream direction is the same as that in the second exemplary embodiment, and the operation in the upstream direction is an operation in which the master side and the slave side are replaced.

At normal times, the relay apparatus 140 receives the PTP packet, updates the PTP packet by the value of the timer G, and transmits fragmented packets to the relay apparatus 130 via the wireless line 104, the relay apparatus 120, and the relay apparatus 110. The relay apparatus 130 receives the fragmented packets from the wireless line 104 and the relay apparatus 110, restores the PTP packet, updates the PTP packet by the value of the timer H, and transmits the PTP packet.

When the wireless line 104 is disconnected, the synchronization processing circuit 137 synchronizes the timer H with the timer G by setting a value obtained by subtracting the value stored in the register from the timer value of the received synchronization packet in the timer H. The relay apparatus 140 receives the PTP packet, updates the PTP packet by the value of the timer G, and transmits the fragmented packets to the relay apparatus 130 via the relay apparatus 120 and the relay apparatus 110. The relay apparatus 130 receives the fragmented packets from the relay apparatus 110, restores the PTP packet, updates the PTP packet by the value of the timer H, and transmits the PTP packet.

As described above, even when the relay apparatus 140 is used as the input apparatus in the upstream direction and the relay apparatus 130 is used as the output apparatus in the upstream direction, the time synchronization can be performed with high precision, similarly to the seventh exemplary embodiment. In addition, the direction in which the synchronization packet is transmitted in the upstream direction and the direction in which the synchronization packet is transmitted in the downstream direction can be made to be the same, and thus, the synchronization packets can be efficiently transmitted. For example, the synchronization packet for the upstream direction and the synchronization packet for the downstream direction may be grouped to be transmitted.

It is to be noted that the present invention is not limited to the above-described exemplary embodiments, and can be modified as appropriate without departing from the scope of the present invention.

Each configuration in the above-described exemplary embodiments is configured by hardware or software, or both thereof, may be configured by one piece of hardware or software, or may be configured by multiple pieces of hardware or software. Each function (each processing) of the relay apparatuses may be achieved by a computer including a CPU (Central Processing Unit), a memory, and the like. For example, a communication program for executing a communication method in the exemplary embodiments is stored in a storage (storage medium), and each function may be achieved by executing the communication program stored in the storage with the CPU.

Although the exemplary embodiments of the present invention have been described, it goes without saying that the present invention is not limited to the above-described exemplary embodiments, and includes other modifications and applications without departing from the scope of the present invention.

A part or all of the above-described exemplary embodiments can be described as the following supplementary notes, but are not limited to the following.

(Supplementary Note 1)

A communication system comprising:

first and second communication apparatuses connected via a first communication line; and third and fourth communication apparatuses connected via a second communication line, wherein the first communication apparatus comprises:

a first clock means that counts a first time;

a first reception means that receives a time synchronization message transmitted from a transmission source apparatus;

a first time synchronization message processing means that updates time information of the received time synchronization message on the basis of the first time;

a first transmission means that transmits the time synchronization message, the time information of which has been updated, to the second communication apparatus via a pathway including the first communication line and a pathway including the third communication apparatus; and a first time synchronization means that executes first time synchronization processing, which is based on the first time, together with the second communication apparatus via the pathway including the first communication line and the pathway including the third communication apparatus, and the second communication apparatus comprises:

a second clock means that counts a second time;

a second reception means that receives the time synchronization message from the first communication apparatus via the pathway including the first communication line and a pathway including the fourth communication apparatus;

a second time synchronization means that executes second time synchronization processing for synchronizing the second time with the first time via the pathway including the first communication line and the pathway including the fourth communication apparatus;

a second time synchronization message processing means that updates the time information of the received time synchronization message on the basis of the second time; and a second transmission means that transmits the time synchronization message, the time information of which has been updated, to a transmission destination apparatus.

(Supplementary Note 2)

The communication system according to Supplementary Note 1, wherein, in the second time synchronization processing, time synchronization is performed on the basis of timing of the first time notified via the first communication line when the first communication line is communicable, and time synchronization is performed on the basis of timing of the first time notified via the third and fourth communication apparatuses when the second communication line is not communicable.

(Supplementary Note 3)

The communication system according to Supplementary Note 2, wherein the second time synchronization means comprises a difference storage means that stores a difference between the timing of the first time notified via the first communication line and the timing of the first time notified via the third and fourth communication apparatuses, and, in the second time synchronization processing, the time synchronization is performed on the basis of the timing of the first time notified via the third and fourth communication apparatuses and the difference stored in the difference storage means when the second communication line is not communicable.

(Supplementary Note 4)

The communication system according to any one of Supplementary Notes 1 to 3, wherein, in the first time synchronization processing, a synchronization pulse synchronized with the first time is transmitted to the second communication apparatus, and, in the second time synchronization processing, the second time is synchronized with timing of the synchronization pulse.

(Supplementary Note 5)

The communication system according to Supplementary Note 4, wherein, in the first time synchronization processing, a communication frame including the synchronization pulse is transmitted via the first communication line, and, in the second time synchronization processing, the second time is synchronized on the basis of the synchronization pulse in the communication frame received via the first communication line.

(Supplementary Note 6)

The communication system according to any one of Supplementary Notes 1 to 5, wherein, in the first time synchronization processing, a clock value indicating the first time is transmitted to the second communication apparatus, and, in the second time synchronization processing, the second time is synchronized with the clock value.

(Supplementary Note 7)

The communication system according to Supplementary Note 6, wherein, in the first time synchronization processing, a synchronization packet including the clock value is transmitted via the third and fourth communication apparatuses, and, in the second time synchronization processing, the second time is synchronized on the basis of the clock value in the synchronization packet received via the third and fourth communication apparatuses.

(Supplementary Note 8)

The communication system according to Supplementary Note 7, wherein the first time synchronization means regularly transmits the synchronization packet including the clock value, and the first transmission means transmits a part of a forward message including the time synchronization message at timing avoiding transmission timing of the synchronization packet.

(Supplementary Note 9)

The communication system according to Supplementary Note 7, comprising:

a synchronization packet transmission line for transmitting the synchronization packet including the clock value; and a forward message transmission line for transmitting the part of the forward message including the time synchronization message.

(Supplementary Note 10)

The communication system according to any one of Supplementary Notes 1 to 3, wherein the third communication apparatus comprises:

a third clock means that counts a third time; and a third time synchronization means that executes third time synchronization processing, which is based on the third time, together with the first communication apparatus and together with the fourth communication apparatus, and the fourth communication apparatus comprises:

a fourth clock means that counts a fourth time; and a fourth time synchronization means that executes fourth time synchronization processing, which is based on the fourth time, together with the third communication apparatus and together with the second communication apparatus.

(Supplementary Note 11)

The communication system according to Supplementary Note 10, wherein, in the third time synchronization processing, the third time is synchronized with the first time, in the fourth time synchronization processing, the fourth time is synchronized with the third time, and, in the second time synchronization processing, the second time is synchronized with the first time or the fourth time.

(Supplementary Note 12)

The communication system according to Supplementary Note 10 or 11, wherein, in the first time synchronization processing, a first synchronization pulse synchronized with the first time is transmitted to the second communication apparatus, in the second time synchronization processing, the second time is synchronized with timing of the first synchronization pulse, in the third time synchronization processing, a second synchronization pulse synchronized with the third time is transmitted to the fourth communication apparatus, and, in the fourth time synchronization processing, the fourth time is synchronized with timing of the second synchronization pulse.

(Supplementary Note 13)

The communication system according to Supplementary Note 12, wherein, in the first time synchronization processing, a communication frame including the first synchronization pulse is transmitted via the first communication line, in the second time synchronization processing, the second time is synchronized on the basis of the first synchronization pulse in the communication frame received via the first communication line, in the third time synchronization processing, a communication frame including the second synchronization pulse is transmitted via the second communication line, and, in the second time synchronization processing, the fourth time is synchronized on the basis of the second synchronization pulse in the communication frame received via the second communication line.

(Supplementary Note 14)

The communication system according to any one of Supplementary Notes 10 to 13, wherein, in the first time synchronization processing, a first clock value indicating the first time is transmitted to the third communication apparatus, in the third time synchronization processing, the third time is synchronized with the first clock value, in the fourth time synchronization processing, a second clock value indicating the fourth time is transmitted to the second communication apparatus, and, in the second time synchronization processing, the second time is synchronized with the second clock value.

(Supplementary Note 15)

The communication system according to Supplementary Note 14, wherein, in the first time synchronization processing, a synchronization packet including the first clock value is transmitted to the third communication apparatus, in the third time synchronization processing, the third time is synchronized on the basis of the first clock value in the synchronization packet received from the first communication apparatus, in the fourth time synchronization processing, a synchronization packet including the second clock value is transmitted to the second communication apparatus, and, in the second time synchronization processing, the second time is synchronized on the basis of the second clock value in the synchronization packet received from the fourth communication apparatus.

(Supplementary Note 16)

The communication system according to Supplementary Note 10, wherein, in the first time synchronization processing, the first time is synchronized with the third time, in the fourth time synchronization processing, the fourth time is synchronized with the third time, and, in the second time synchronization processing, the second time is synchronized with the first time or the fourth time.

(Supplementary Note 17)

The communication system according to Supplementary Note 10, wherein, in the third time synchronization processing, the third time is synchronized with the first time, in the second time synchronization processing, the second time is synchronized with the first time, in the fourth time synchronization processing, the fourth time is synchronized with the second time or the third time, and the fourth communication apparatus updates the time information of the time synchronization message received via a pathway including the second communication line and the pathway including the third communication apparatus on the basis of the fourth time.

(Supplementary Note 18)

The communication system according to Supplementary Note 1, wherein the second communication apparatus further comprises:
a third clock means that counts a third time;
a third reception means that receives a time synchronization message transmitted from the transmission destination apparatus;
a third time synchronization message processing means that updates time information of the received time synchronization message on the basis of the third time;
a third transmission means that transmits the time synchronization message, the time information of which has been updated, to the first communication apparatus via the pathway including the first communication line and the pathway including the fourth communication apparatus; and
a third time synchronization means that executes third time synchronization processing, which is based on the third time, together with the first communication apparatus via the pathway including the first communication line and the pathway including the fourth communication apparatus, and the first communication apparatus further comprises:
a fourth clock means that counts a fourth time;
a fourth reception means that receives the time synchronization message from the second communication apparatus via the pathway including the first communication line and the pathway including the third communication apparatus;
a fourth time synchronization means that executes the second time synchronization processing for synchronizing the fourth time with the third time via the pathway including the first communication line and the pathway including the third communication apparatus;
a fourth time synchronization message processing means that updates the time information of the received time synchronization message on the basis of the fourth time; and
a fourth transmission means that transmits the time synchronization message, the time information of which has been updated, to the transmission source apparatus.

(Supplementary Note 19)

The communication system according to Supplementary Note 1, wherein
the fourth communication apparatus comprises:
a third clock means that counts a third time;
a third reception means that receives a time synchronization message transmitted from the transmission destination apparatus;
a third time synchronization message processing means that updates time information of the received time synchronization message on the basis of the third time;
a third transmission means that transmits the time synchronization message, the time information of which has been updated, to the third communication apparatus via a pathway including the second communication line and a pathway including the second communication apparatus; and a third time synchronization means that executes third time synchronization processing, which is based on the third time, together with the third communication apparatus via the pathway including the second communication line and the pathway including the second communication apparatus, and the third communication apparatus comprises:

a fourth clock means that counts a fourth time;

a fourth reception means that receives the time synchronization message from the fourth communication apparatus via the pathway including the second communication line and a pathway including the first communication apparatus;

a fourth time synchronization means that executes the second time synchronization processing for synchronizing the fourth time with the third time via the pathway including the second communication line and the pathway including the first communication apparatus;

a fourth time synchronization message processing means that updates the time information of the received time synchronization message on the basis of the fourth time; and a fourth transmission means that transmits the time synchronization message, the time information of which has been updated, to the transmission source apparatus.

(Supplementary Note 20)

The communication system according to any one of Supplementary Notes 1 to 19, wherein the first time synchronization message processing means subtracts the first time from the time information of the time synchronization message, and the second time synchronization message processing means adds the second time to the time information of the time synchronization message.

(Supplementary Note 21)

The communication system according to any one of Supplementary Notes 1 to 20, wherein the first transmission means fragments the time synchronization message into a plurality of fragmented messages, and transmits the plurality of fragmented messages via the pathway including the first communication line and the pathway including the third communication apparatus, and the second reception means receives the plurality of fragmented messages via the pathway including the first communication line and the pathway including the fourth communication apparatus, and unites the received plurality of fragmented messages to restore the time synchronization message.

This application claims priority to Japanese Patent Application No. 2014-030768 filed on Feb. 20, 2014, the entire contents of which are incorporated herein.

REFERENCE SIGNS LIST 1 communication system
2, 3 communication line
10, 20, 30, 40 communication apparatus
11, 21 clock unit
12, 22 reception unit
13, 23 time synchronization message processing unit
14, 24 time synchronization unit
15, 25 transmission unit
100 communication system
101 master communication unit
102 slave communication unit
103, 104 wireless line
105, 105a, 105b wire line
106, 106a, 106b wire line
107, 108 wire line
110, 120, 130, 140 relay apparatus
111, 121, 131, 141 IF circuit
112, 122, 132, 142 aggregation processing circuit
113, 123, 133, 143 frame processing circuit
114, 116, 124, 126, 136, 144, 146 TC processing circuit
115, 117, 125, 127, 135, 137, 145, 147 synchronization processing circuit
125a register
201 clock master apparatus
202 clock slave apparatus

The invention claimed is:

1. A communication system comprising:

first and second communication apparatuses connected via a first communication line; and third and fourth communication apparatuses connected via a second communication line, wherein the first communication apparatus comprises:

a first clock unit that counts a first time;

a first reception unit that receives a time synchronization message transmitted from a transmission source apparatus;

a first time synchronization message processing unit that updates time information of the received time synchronization message on the basis of the first time;

a first transmission unit that transmits the time synchronization message, the time information of which has been updated, to the second communication apparatus via a pathway including the first communication line and a pathway including the third communication apparatus; and a first time synchronization unit that executes first time synchronization processing, which is based on the first time, together with the second communication apparatus via the pathway including the first communication line and the pathway including the third communication apparatus, and the second communication apparatus comprises:

a second clock unit that counts a second time;

a second reception unit that receives the time synchronization message from the first communication apparatus via the pathway including the first communication line and a pathway including the fourth communication apparatus;

a second time synchronization unit that executes second time synchronization processing for synchronizing the second time with the first time via the pathway including the first communication line and the pathway including the fourth communication apparatus;

a second time synchronization message processing unit that updates the time information of the received time synchronization message on the basis of the second time; and a second transmission unit that transmits the time synchronization message, the time information of which has been updated, to a transmission destination apparatus, wherein in the second time synchronization processing, the second time synchronization unit performs time synchronization on the basis of timing of the first time notified via the first communication line when the first communication line is communicable, the second time synchronization unit comprises a difference storage unit that stores a difference between the timing of the first time notified via the first communication line and the timing of the first time notified via the third and fourth communication apparatuses, and in the second time synchronization processing, the second time synchronization unit performs time synchronization on the basis of the timing of the first time notified via the third and fourth communication apparatuses and the difference stored in the difference storage unit when the second communication line is not communicable.

2. The communication system according to claim 1, wherein, in the first time synchronization processing, the first time synchronization unit transmits a synchronization pulse synchronized with the first time to the second communication apparatus, and, in the second time synchronization processing, the second time synchronization unit synchronizes the second time with timing of the synchronization pulse.

3. The communication system according to claim 2, wherein, in the first time synchronization processing, the first time synchronization unit transmits a clock value indicating the first time to the second communication apparatus, and, in the second time synchronization processing, the second time synchronization unit synchronizes the second time with the clock value.

4. The communication system according to claim 3, wherein the first time synchronization unit regularly transmits the synchronization packet including the clock value, and the first transmission unit transmits a part of a forward message including the time synchronization message at timing avoiding transmission timing of the synchronization packet.

5. The communication system according to claim 3, comprising:

a synchronization packet transmission line for transmitting the synchronization packet including the clock value; and a forward message transmission line for transmitting the part of the forward message including the time synchronization message.

6. The communication system according to claim 1, wherein the third communication apparatus comprises:
 a third clock unit that counts a third time; and
 a third time synchronization unit that executes third time synchronization processing, which is based on the third time, together with the first communication apparatus and together with the fourth communication apparatus, and the fourth communication apparatus comprises:
 a fourth clock unit that counts a fourth time; and
 a fourth time synchronization unit that executes fourth time synchronization processing, which is based on the fourth time, together with the third communication apparatus and together with the second communication apparatus.

7. The communication system according to claim 4, wherein the second communication apparatus further comprises:
 a third clock unit that counts a third time;
 a third reception unit that receives a time synchronization message transmitted from the transmission destination apparatus;
 a third time synchronization message processing unit that updates time information of the received time synchronization message on the basis of the third time;
 a third transmission unit that transmits the time synchronization message, the time information of which has been updated, to the first communication apparatus via the pathway including the first communication line and the pathway including the fourth communication apparatus; and
 a third time synchronization unit that executes third time synchronization processing, which is based on the third time, together with the first communication apparatus via the pathway including the first communication line and the pathway including the fourth communication apparatus, and the first communication apparatus further comprises:
 a fourth clock unit that counts a fourth time;
 a fourth reception unit that receives the time synchronization message from the second communication apparatus via the pathway including the first communication line and the pathway including the third communication apparatus;
 a fourth time synchronization unit that executes the second time synchronization processing for synchronizing the fourth time with the third time via the pathway including the first communication line and the pathway including the third communication apparatus;
 a fourth time synchronization message processing unit that updates the time information of the received time synchronization message on the basis of the fourth time; and
 a fourth transmission unit that transmits the time synchronization message, the time information of which has been updated, to the transmission source apparatus.

8. The communication system according to claim 5, wherein the fourth communication apparatus comprises:
 a third clock unit that counts a third time;
 a third reception unit that receives a time synchronization message transmitted from the transmission destination apparatus;
 a third time synchronization message processing unit that updates time information of the received time synchronization message on the basis of the third time;
 a third transmission unit that transmits the time synchronization message, the time information of which has been updated, to the third communication apparatus via a pathway including the second communication line and a pathway including the second communication apparatus; and
 a third time synchronization unit that executes third time synchronization processing, which is based on the third time, together with the third communication apparatus via the pathway including the second communication line and the pathway including the second communication apparatus, and the third communication apparatus comprises:
 a fourth clock unit that counts a fourth time;
 a fourth reception unit that receives the time synchronization message from the fourth communication apparatus via the pathway including the second communication line and a pathway including the first communication apparatus;

a fourth time synchronization unit that executes the second time synchronization processing for synchronizing the fourth time with the third time via the pathway including the second communication line and the pathway including the first communication apparatus;

a fourth time synchronization message processing unit that updates the time information of the received time synchronization message on the basis of the fourth time; and a fourth transmission unit that transmits the time synchronization message, the time information of which has been updated, to the transmission source apparatus.

9. A communication method in a communication system comprising first and second communication apparatuses connected via a first communication line, and third and fourth communication apparatuses connected via a second communication line, the communication method comprising:

in the first communication apparatus,
counting a first time;
receiving a time synchronization message transmitted from a transmission source apparatus;
updating time information of the received time synchronization message on the basis of the first time;
transmitting the time synchronization message, the time information of which has been updated, to the second communication apparatus via a pathway including the first communication line and a pathway including the third communication apparatus; and
executing first time synchronization processing, which is based on the first time, together with the second communication apparatus via the pathway including the first communication line and the pathway including the third communication apparatus, and in the second communication apparatus,
counting a second time;
receiving the time synchronization message from the first communication apparatus via the pathway including the first communication line and a pathway including the fourth communication apparatus;
executing second time synchronization processing for synchronizing the second time with the first time via the pathway including the first communication line and the pathway including the fourth communication apparatus;
updating the time information of the received time synchronization message on the basis of the second time; and
transmitting the time synchronization message, the time information of which has been updated, to a transmission destination apparatus, wherein
the executing the second time synchronization processing includes performing time synchronization on the basis of timing of the first time notified via the first communication line when the first communication line is communicable,
the communication method further comprises, in the second communication apparatus, storing a difference between the timing of the first time notified via the first communication line and the timing of the first time notified via the third and fourth communication apparatuses, and
the executing the second time synchronization processing includes performing time synchronization on the basis of the timing of the first time notified via the third and fourth communication apparatuses and the stored difference when the second communication line is not communicable.

* * * * *